Oct. 26, 1937.  H. R. SCHUTZ  2,097,135
TUMBLER DECORATING MACHINE
Filed Feb. 4, 1935  11 Sheets-Sheet 1

Inventor
Harold R. Schutz
By Barnett & Truman
Attorneys.

Oct. 26, 1937.  H. R. SCHUTZ  2,097,135
TUMBLER DECORATING MACHINE
Filed Feb. 4, 1935  11 Sheets-Sheet 4

Inventor
Harold R. Schutz
By
Barnett Truman
Attorneys

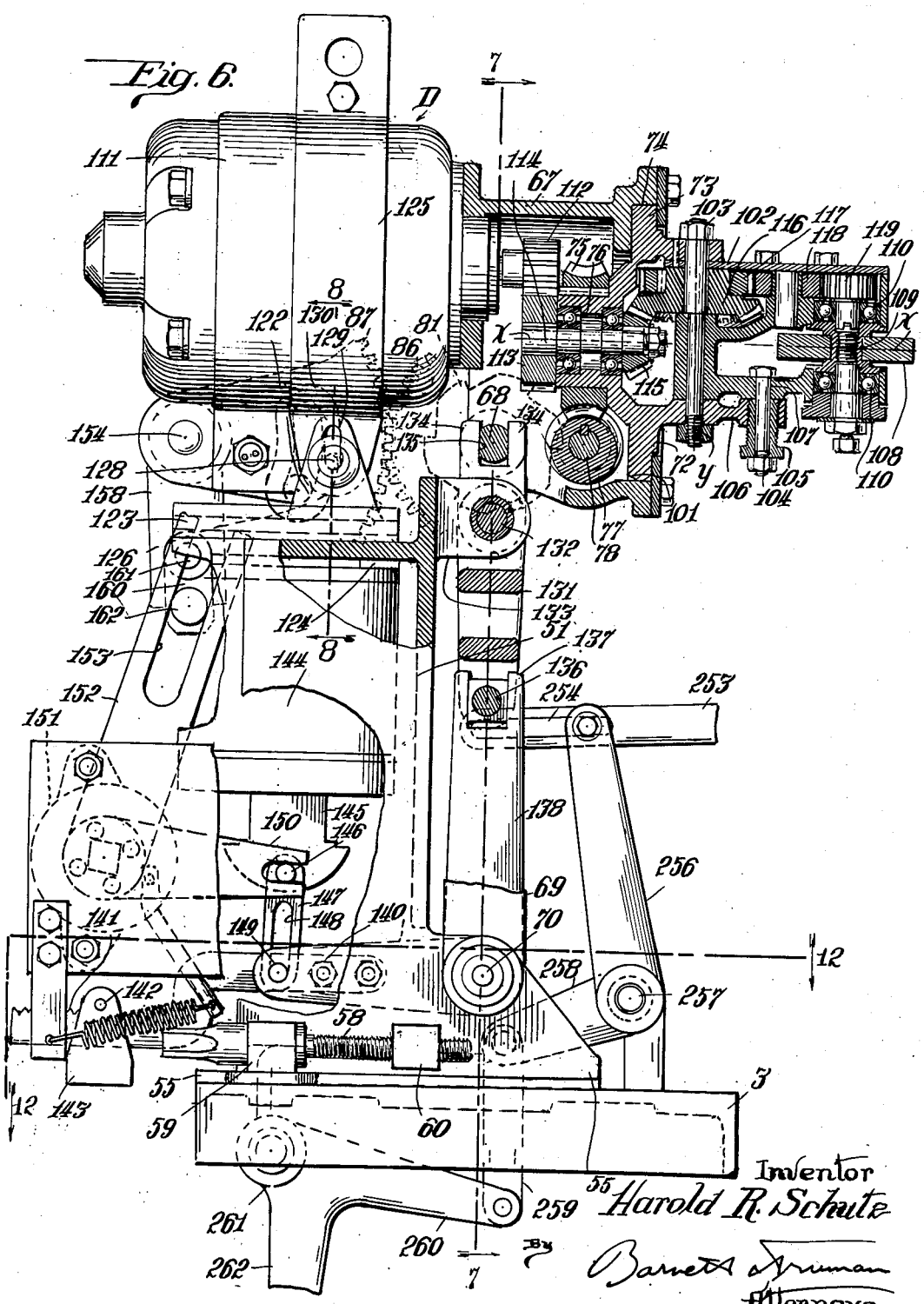

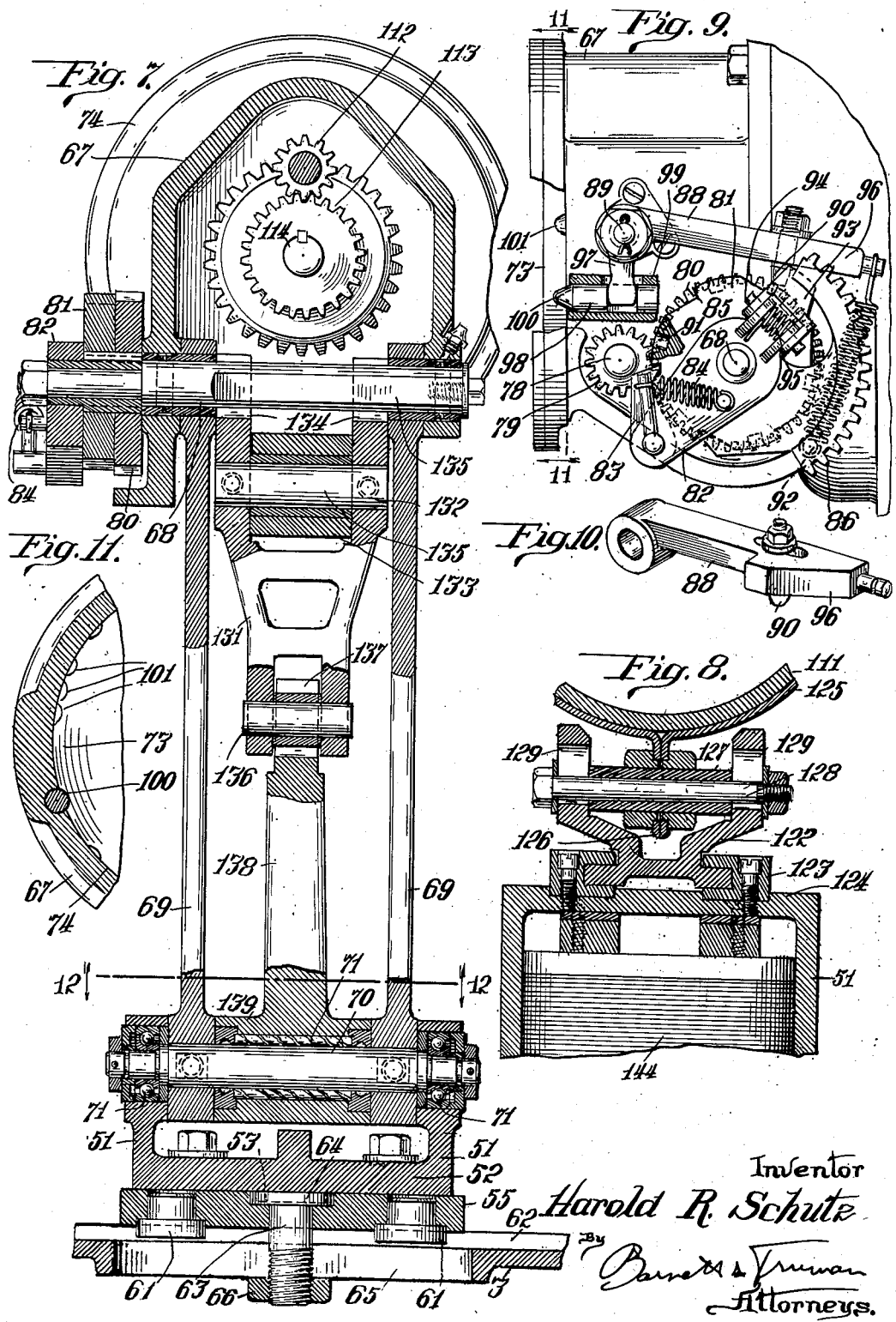

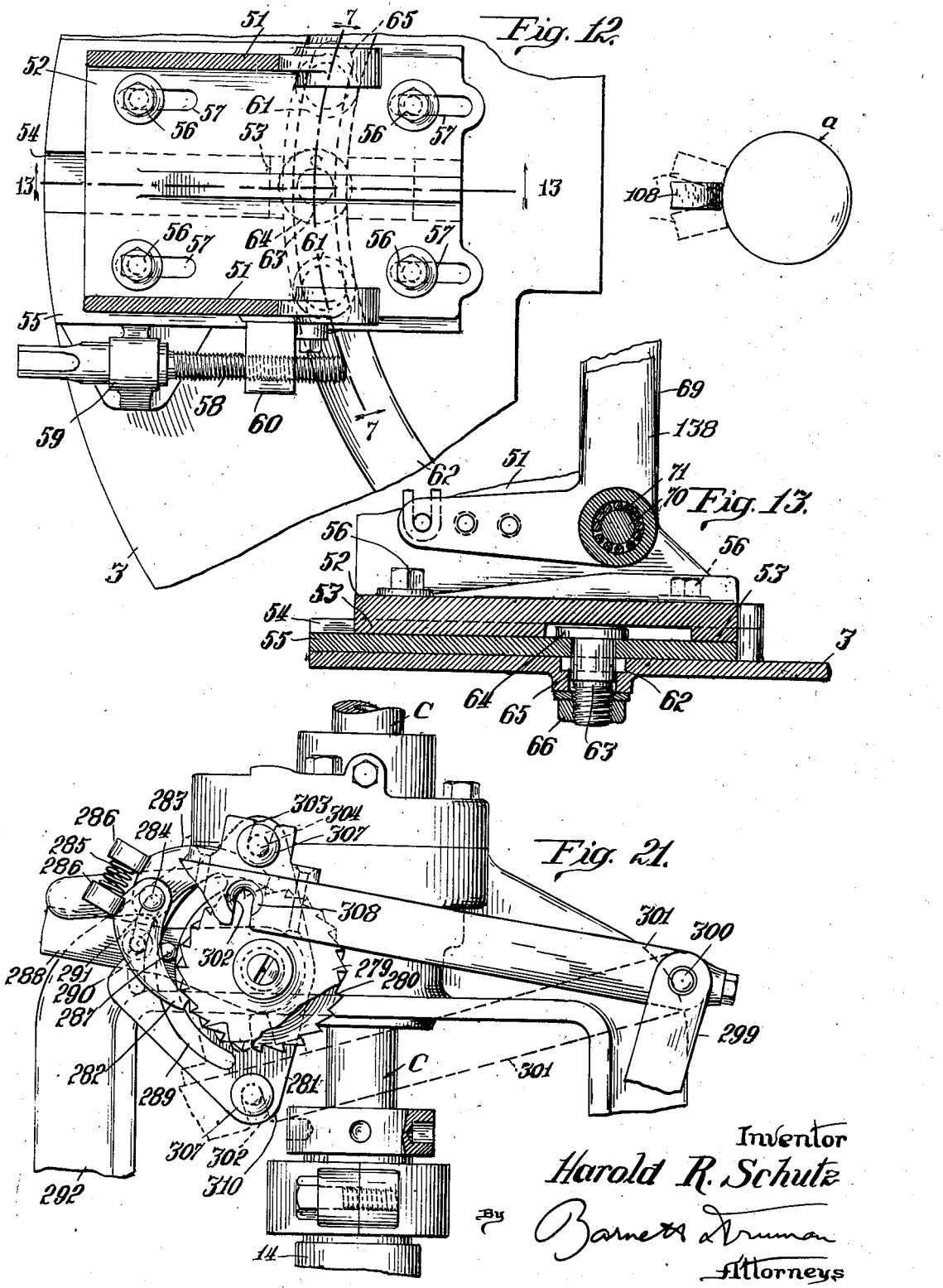

Oct. 26, 1937.  H. R. SCHUTZ  2,097,135
TUMBLER DECORATING MACHINE
Filed Feb. 4, 1935  11 Sheets-Sheet 8
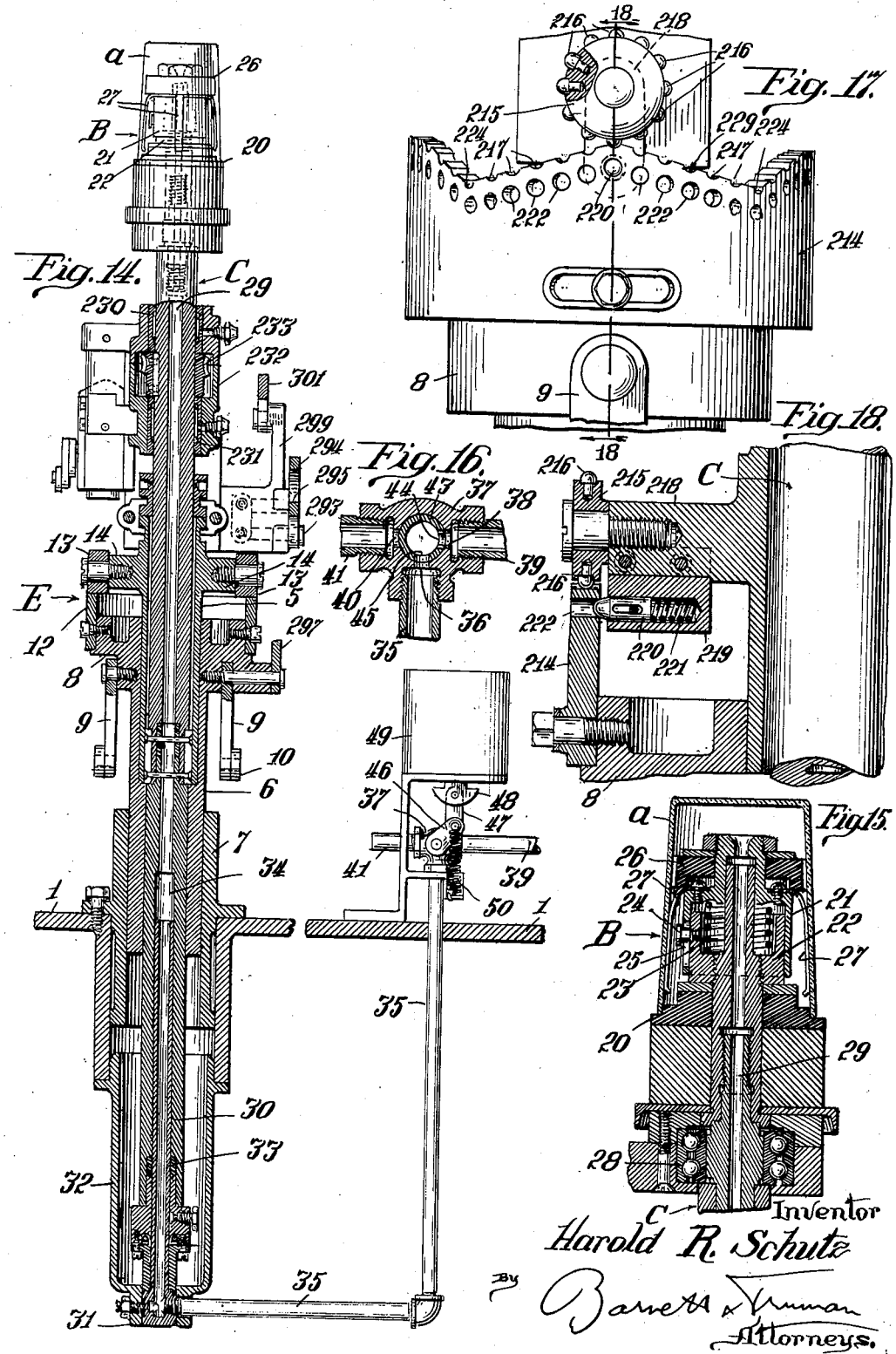

Oct. 26, 1937.   H. R. SCHUTZ   2,097,135
TUMBLER DECORATING MACHINE
Filed Feb. 4, 1935   11 Sheets-Sheet 9

Inventor
Harold R. Schutz
By Barnett A. Truman
Attorneys

Oct. 26, 1937.   H. R. SCHUTZ   2,097,135
TUMBLER DECORATING MACHINE
Filed Feb. 4, 1935   11 Sheets-Sheet 10

Inventor
Harold R. Schutz
By Barnett & Truman
Attorneys

Oct. 26, 1937.    H. R. SCHUTZ    2,097,135
TUMBLER DECORATING MACHINE
Filed Feb. 4, 1935    11 Sheets-Sheet 11
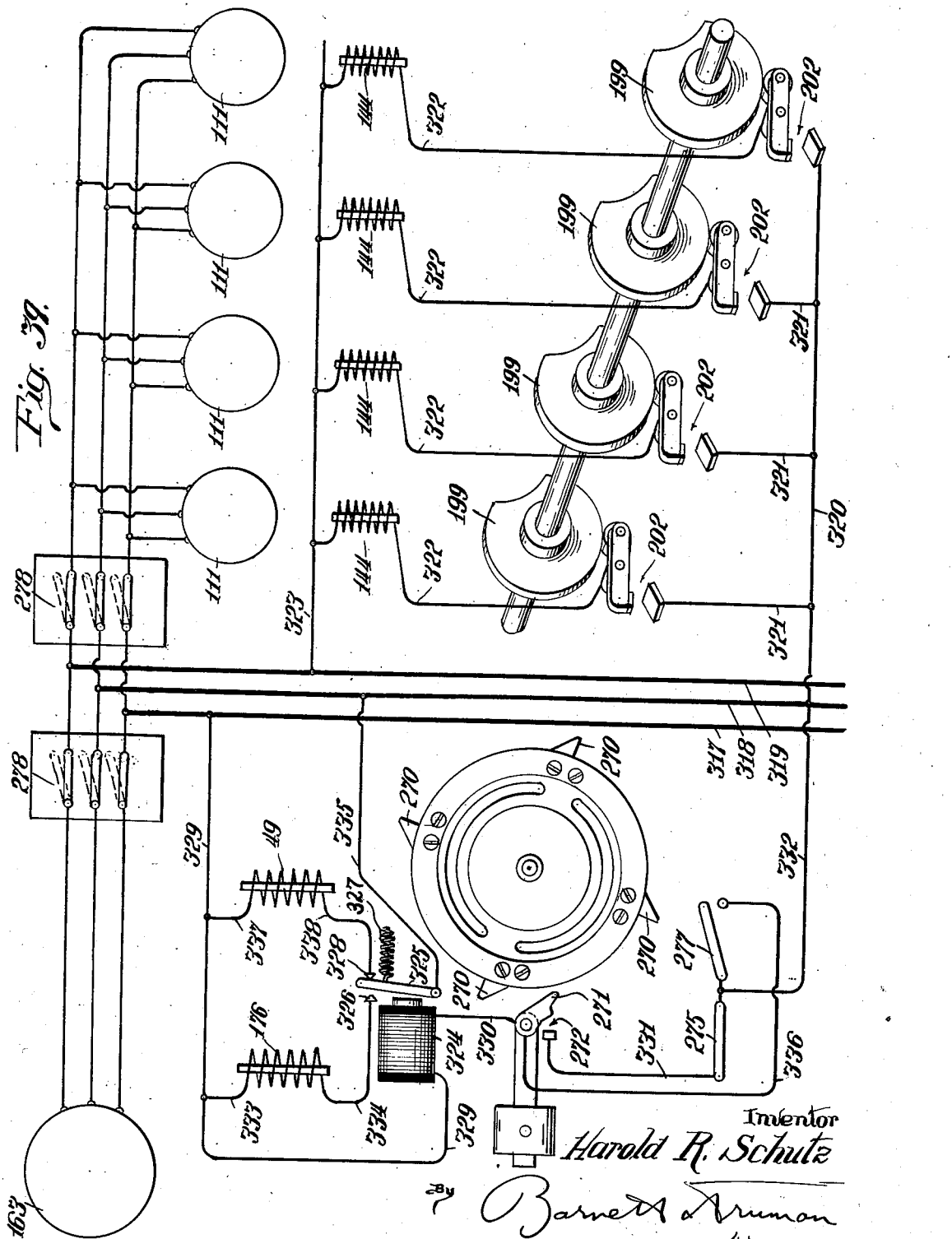
Inventor
Harold R. Schutz
By Barnett A. Truman
Attorneys Patented Oct. 26, 1937

2,097,135

UNITED STATES PATENT OFFICE 2,097,135

TUMBLER DECORATING MACHINE

Harold R. Schutz, Ottawa Hills, Ohio, assignor, by mesne assignments, to Libbey Glass Company, Toledo, Ohio, a corporation of Ohio Application February 4, 1935, Serial No. 4,916

37 Claims. (Cl. 51—107)

This invention relates to certain new and useful improvements in decorating apparatus, and more particularly to an improved machine for grinding or cutting designs on the exposed surface of a glass tumbler or similar article.

The improved machine, briefly described, comprises a plurality of similar grinding tools adapted to operate simultaneously upon the surface of the tumbler and make similar cuts at different locations thereon. The machine is almost entirely automatic in its operation and includes means for moving the cutting tools into and out of grinding relation with the tumbler, means for indexing or adjusting the tools to make cuts of different angularity, means for rotating or indexing the tumbler while the tools are moved out of grinding position so as to present new surfaces to be ground, and means for moving the tumbler during the grinding operation to vary the shape or design of the cuts made by the grinding tools. The cutting tools and the tumbler-moving mechanisms are actuated by continuously running motors and electrically actuated solenoids controlled by automatic switches are used for relatively moving certain of the parts so as to bring about the different operations in properly timed relation to one another, and to stop these operations when they have been completed.

The principal object of this invention is to provide an improved decorating apparatus such as briefly described hereinabove and disclosed in detail in the specifications which follow.

Another object is to provide improved means for supporting and adjusting the grinding tool and moving it into and out of grinding position.

Another object is to provide improved means for indexing the grinding tool to make cuts of different angularity, or cuts angularly spaced about a given point.

Another object is to provide improved means for supporting the tumbler.

Another object is to provide improved means for indexing the tumbler about its longitudinal axis to present selected surfaces to be ground.

Another object is to provide improved means for moving the tumbler between grinding operations so as to dispose the cuts or designs at different positions lengthwise of the tumbler.

Another object is to provide improved means for moving the tumbler during a grinding operation to secure cuts of various forms.

Another object is to provide improved electrical control means for the decorating machine.

Other objects and advantages of this invention will be more apparent from the following detailed description of one approved form of apparatus constructed and operating according to the principles of this invention.

In the accompanying drawings:

Fig. 6 is an elevation of one of the grinding heads, with certain parts shown in vertical section.

Fig. 7 is a vertical section taken substantially on the line 7—7 of Fig. 6, the extreme lower portion of this figure being taken on the line 7—7 of Fig. 12.

Fig. 8 is a vertical section taken substantially on the line 8—8 of Fig. 6.

Fig. 9 is an elevation showing a portion of the grinding-wheel indexing mechanism, which is located on the far side of the head, as shown in Fig. 6.

Fig. 10 is a perspective detail of the ratchet-locking member shown in Fig. 9.

Fig. 11 is a detail section taken substantially on the line 11—11 of Fig. 9.

Fig. 12 is a horizontal section taken substantially on the line 12—12 of Figs. 6 and 7, and showing the adjustable head-supporting plate.

Fig. 13 is a vertical section taken substantially on the line 13—13 of Fig. 12.

Fig. 14 is a vertical section through the mechanism supported by the central vertical shaft.

Fig. 15 is an enlarged vertical section through the tumbler-supporting chuck shown at the top of Fig. 14.

Fig. 16 is a detail section through the three-way valve shown in Fig. 14.

Fig. 17 is a partial elevation showing an alternative form of shaft-supporting cam.

Fig. 18 is a vertical section taken substantially on the line 18—18 of Fig. 17.

Fig. 21 is an elevation, partially broken away, looking from the right at Fig. 19.

Figs. 22 to 26, inclusive, are partial sections taken through different types of cutting or grinding wheels.

Figs. 27 to 38, inclusive, indicate examples of designs that may be cut by this machine.

Fig. 39 is a wiring diagram of the electrical connections.

In general, the machine may be described as comprising the supporting frame A, the chuck assembly B for holding the glass tumbler, the vertical shaft assembly C which supports and moves the chuck and tumbler, the several similar grinding heads and associated parts indicated at D, D', D'' and D''', the assembly E positioned centrally of the machine for imparting the desired movements to the tumbler-supporting shaft C, and the driving assembly indicated generally at F for moving the shaft C and controlling the heads D.

The main supporting frame comprises a lower platform 1 carried by legs 2, a central annular platform 3 supported above platform 1 by posts 4 and a plurality of auxiliary frame members or brackets, some of which will be hereinafter referred to.

Figure 2:
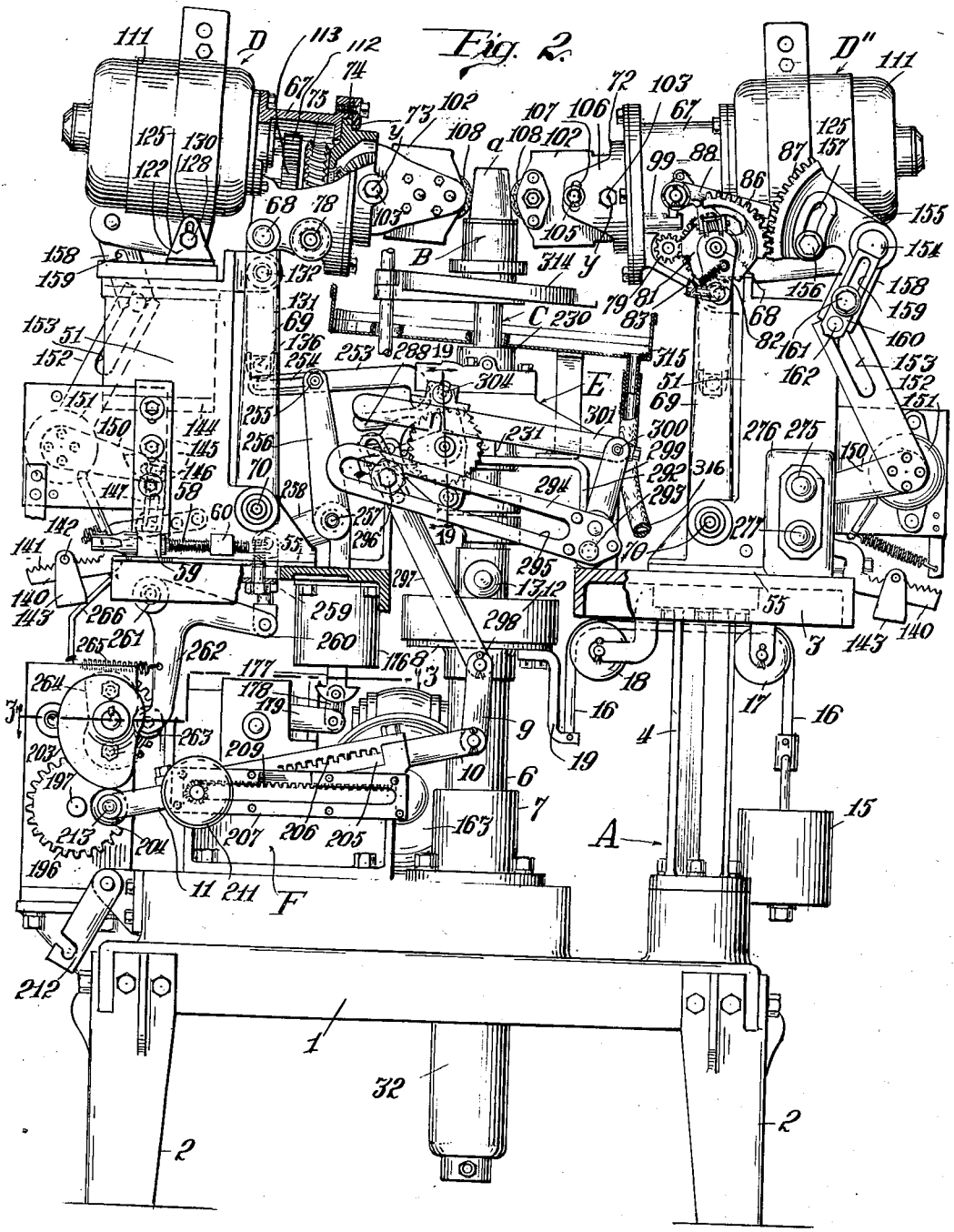
Fig. 2 is a vertical section, in part, looking substantially from the rear of the machine as shown in Fig. 1, this section being taken so as to remove the grinding head nearest the observer. Also for the sake of clearness the grinding head on the farther side has been omitted.

The main shaft C (see Figs. 2 and 14) has its lower portion secured within a sleeve member 5 which is rotatable and vertically slidable within a larger sleeve member 6, which in turn is vertically slidable within a fixed cylindrical bearing sleeve 7 carried by a portion of the platform 1. The enlarged head 8 of sleeve 6 is supported by a pair of links 9 from the yoke 10 (Figs. 2 and 3) at the end of lever 11, which will hereinafter be described more in detail. The head 8 carries a circular track 12 on which travel the rollers 13 mounted on the arms 14 extending outwardly from sleeve 5 which supports the shaft C. The upper surface of track 12 may lie in a single horizontal plane, as shown in Figs. 2 and 14, or may be in the form of an annular cam, as shown for example in Fig. 17. This latter is for the purpose of moving the shaft longitudinally as it is rotated, and will be described more in detail hereinafter. The counterweight 15 (Fig. 2), carried by cable 16 extending over guide pulleys 17 and 18 to a bracket 19 and secured to head 8 of the sleeve 6, counter-balances a portion of the weight of this movable shaft assembly. The several mechanisms for rotating shaft C and moving it longitudinally will be described hereinafter.

The tumbler-supporting chuck device B (see Figs. 1, 2, 14, 15 and 16) is supported by the upper end portion of shaft C. This chuck comprises a rest or platen 20 on which is centered and supported the open edge portion of the inverted glass tumbler, indicated at a. An inverted cup member 21 telescopes slidably over the upper end of shaft C and over an upright cup member 22 mounted centrally on the rest 20. An expansion spring 23 is confined between the two cup members and the separating movement of the cups is limited by a stop pin 24 mounted in cup member 22 and projecting through a slot 25 in cup 21. An inner chuck member 26 carried by cup 21 is adapted to clamp yieldingly within the tumbler a when the tumbler is pressed down onto the rest 20 so as to properly center the tumbler and hold it in place during the grinding operations. A plurality of leaf-springs 27 secured at their upper ends between chuck-member 26 and cup 21 are compressed toward one another by the tumbler as it is pressed down onto the chuck, thus directing the tumbler to a properly centered position and preventing chipping of the tumbler edges. The upper portion of shaft C directly beneath the chuck, is rotatably supported in a bearing 28.

A passage 29 extends longitudinally throughout the length of shaft C and the chuck members supported at the upper end thereof so as to communicate with the space within tumbler a. A stationary pipe section 30 is secured at its lower end in a head 31 carried by a fixed housing 32, and projects slidably upward through packing means 33 into an enlarged portion 34 of passage 29. The passage in head 31 is connected through pipe 35 with one port 36 in valve casing 37. This valve casing also has port 38 connected by pipe 39 with a suction pump or other source of sub-atmospheric pressure, and port 40 connected with the atmosphere through pipe 41. The rotatable valve member 43 is provided with connected ports 44, 45 adapted to register with either ports 38 and 36, or ports 36 and 40. Valve member 43 is oscillated through an arc of 90° by crank-arm 46 connected by link 47 with the core 48 of a solenoid 49. As will be hereinafter explained, when a grinding operation is started the solenoid 49 will be energized and the valve will be moved to the position shown in Figs. 14 and 16, thus exhausting the air from the interior of tumbler a so that it will be held firmly on the chuck device by atmospheric pressure. When the operation is stopped, solenoid 49 will be deenergized, thus permitting spring 50 to swing the valve to its other position so that air at atmospheric pressure is admitted through pipe 41, thus breaking the vacuum and permitting the tumbler a to be lifted from the chuck.

The several grinding heads D, D', etc. may all be of substantially identical construction and a description of one will suffice for all. In the present example there are four of these grinding heads used, spaced at 90° with one another about the tumbler so as to simultaneously make similar cuts at four different positions on the tumbler. Therefore, four designs can be cut upon the tumbler without rotating the tumbler at all. If a circular series of cuts or designs are to be made, the tumbler is rotated or indexed step by step, and at the end of a 90° movement, the complete circular series of cuts have been completed. It will be apparent as the description progresses that one or any convenient number of heads D could be used. Each of these grinding assemblies (see Figs. 1, 2 and 6 to 13, inclusive) comprises a main supporting standard or casing 51 having a base plate 52 provided on its bottom with keys 53 slidable radially of the machine, or toward or from the central vertical axis of shaft C, in a slideway 54 in a supporting plate 55 (Figs. 7, 12 and 13). Clamping screws 56 threaded in plate 55 project through slots 57 in base 52. An adjusting screw 58 is pivotally mounted in a boss 59 on plate 55 and is threaded in a boss 60 on base-member 52. To adjust the grinding head radially of the machine the screws 56 are loosened and the base 52 moved in or out along plate 55 by rotating screw 58 in the proper direction. In this manner the entire grinding head can be adjusted toward or from the central axis of the machine to position the grinding tool for different sizes of tumblers.

Guide members 61 secured in supporting plate 55 project down into an arcuate channel 62 formed in platform 3 and centered about the axis of shaft C. A clamping bolt 63 having its head 64 seated in an opening in the top of plate 55 projects down through an arcuate slot 65 in platform 3 and the bolt and plate 55 may be secured in any selected position by tightening the nut 66 on the lower end of the bolt. This latter adjustment permits one or more of the heads to be adjusted circumferentially of the machine with respect to adjacent heads so that the heads may be somewhat more or less than 90° apart for making certain designs, as will be hereinafter explained.

The housing 67 (Figs. 1, 2, 6 and 7) is pivotally supported on the ends of a shaft 68 mounted in the upper end portions of a pair of levers 69, keyed at their lower ends on a shaft 70 mounted in roller bearing 71 in the main supporting frame 51. A second frame or gear casing 72 has an outer annular collar 73 which is rotatable in a guideway 74 in housing 67 so that the frame member 72 may be indexed or rotated about the substantially horizontal central axis $x$. A worm wheel 75, keyed on the inwardly extending hollow hub 76 of casing 72 meshes with worm 77 secured on horizontal shaft 78 journaled in the frame 67. A pinion 79 (Fig. 9) on one outer end of shaft 78 meshes with a gear 80 (Fig. 7) rotatably mounted on one outer end of shaft 68. A ratchet wheel 81 is keyed to the gear 80 so that the two rotate as a unit. A pawl-holder 82 (Fig. 9) mounted to oscillate on the outer end portion of shaft 68 carries a pawl 83 held by spring 84 in yieldable engagement with the teeth 85 of the ratchet wheel. The pawl holder is formed on one side with a gear sector 86 which meshes with a similar gear sector 87 by which the pawl and pawl-holder are oscillated, as will be hereinafter described. A locking lever 88 (Figs. 9 and 10), pivoted at one end on the fixed pin 89, carries a locking pin 90 which is adapted to engage in any one of a plurality of openings 91 formed in the periphery of the ratchet wheel. The spring 92, fixed at one end, and engaging the lever 88 at the other end, is adapted to normally hold the locking pin in one of the openings 91. A small cam plate 93 is pivoted at 94 on the outer face of pawl holder 82, and is normally held in the extended position shown in Fig. 9 by the torsion spring 95. As the pawl holder 82 is rotated in a clockwise direction (Fig. 9) the cam 93 will first engage beneath a portion of the lever 88 and lift this lever against the resistance of spring 92 so as to withdraw pin 90 from an opening 91. The ratchet teeth are so positioned that as soon as this locking pin has been withdrawn, the pawl 83 engages one of the teeth 85 and rotates the ratchet wheel through a certain arc. Before this movement is finished the cam 93 will have passed from beneath the lever 88 so as to release the next locking pin 90 which will be pulled into the next opening 91 as soon as the desired rotation of the ratchet has been completed. On the return or counterclockwise movement of the pawl holder, the cam 93 will be swung outwardly against the resistance of spring 95 by means of a second cam surface 96 formed on the side of the lever 88 so that the locking pin will not be released during this return movement. Each of these actuations of the ratchet wheel 81 will, through the train of gearing previously described, rotate the frame 72 through a certain arc sufficient to index the grinding wheel to the position desired for the next cut. By substituting ratchet wheels having different numbers of teeth, and changing the amplitude of oscillation of the pawl-holder, the length of these successive indexing arcs can be varied as desired. A crank-arm 97, connected to oscillate with the locking-lever 88, projects into a slot in a locking pin 98 guided in casing member 99 and having a tapered end 100 adapted to seat in one of a plurality of grooves 101 cut in the peripheral edge of annular collar 73 or a ring secured thereto. This locking means will be automatically engaged whenever frame 72 has been adjusted to a new position so as to lock the frame firmly in place and prevent chattering.

An auxiliary frame or gear casing 102 (Figs. 1, 2 and 6), in which the grinding wheel is mounted, is pivoted on a shaft 103 mounted in casing 72, so as to swing about the transverse axis $y$. A locking bolt 104 extending through a lock nut 105 mounted in a bracket extension 106 of casing 72, extends through a slot 107 (see Fig. 2) in the casing 102 so as to permit the casing 102 to be clamped in different angularly adjusted positions about the axis $y$.

Figure 27:
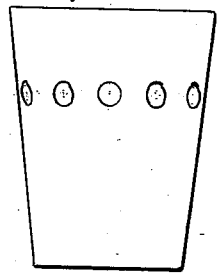
Figure 28:
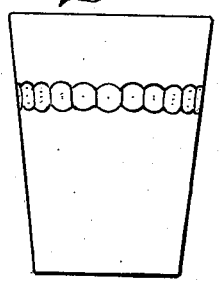
Figure 29:
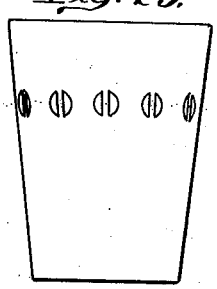
Figure 30:
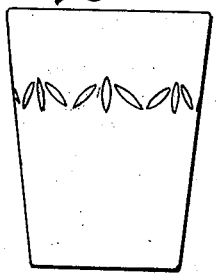
Figure 31:
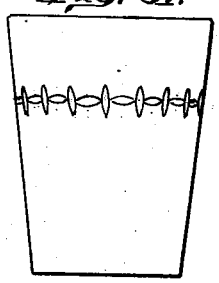
Figure 32:
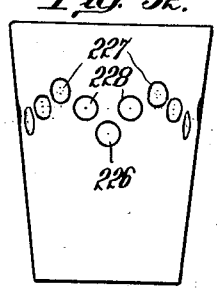
Figure 33:
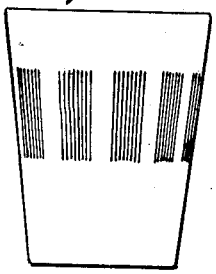

The grinding wheel 108 is mounted on a spindle 109 journaled in ball-bearings 110 and removably positioned in the frame 102 so that different types of grinding or cutting wheels can be substituted for one another. Examples of different forms that may be given to the grinding faces of the wheels are indicated in Figs. 22 to 26, inclusive. Substantially round or oval cuts are made with wheels having flat or rounded faces, such as shown respectively at 108 in Fig. 22, and at 108$^a$ in Fig. 23. Designs of this type are indicated in Figs. 27, 28 and 32. Narrower and deeper cuts, such as used in the designs shown in Figs. 30, 31, 34, 35, 36, 37 and 38 may be made with a wheel of the type shown at 108$^b$ in Fig. 24. A plurality of parallel line cuts, such as shown in Fig. 33, may be made with a wheel having a toothed face, such as shown at 108$^c$ in Fig. 25. Pairs of spaced cuts, such as shown in the Fig. 29 design can be made with a wheel having a split face, such as shown at 108$^d$ in Fig. 26.

The grinding wheel 108 is rotated from a constantly rotating electric motor 111 secured to the outer face of the frame 67. Pinion 112 on the motor shaft meshes with a gear 113 secured on one end of a shaft 114 journaled in roller bearings within hub 76. A beveled gear 115 on the opposite end of shaft 114 meshes with a bevel gear 116 rotatable on transverse shaft 103. A spur gear 117 keyed on hub of bevel gear 116 meshes with a gear 118 which in turn meshes with pinion 119 on one end of the spindle 109 which carries the grinding wheel. Through this train of gearing the grinding wheel will be constantly rotated from the motor 111. It will be noted that as frame 72 is indexed around the horizontal axis $x$, the bevel gear 116 will roll around the bevel gear 115 so as not to affect the action of the gear train. In a similar manner, as the auxiliary frame 102 is swung about the transverse axis $y$, the gear 118 will roll around the gear 117 with which it meshes.

Figure 1:
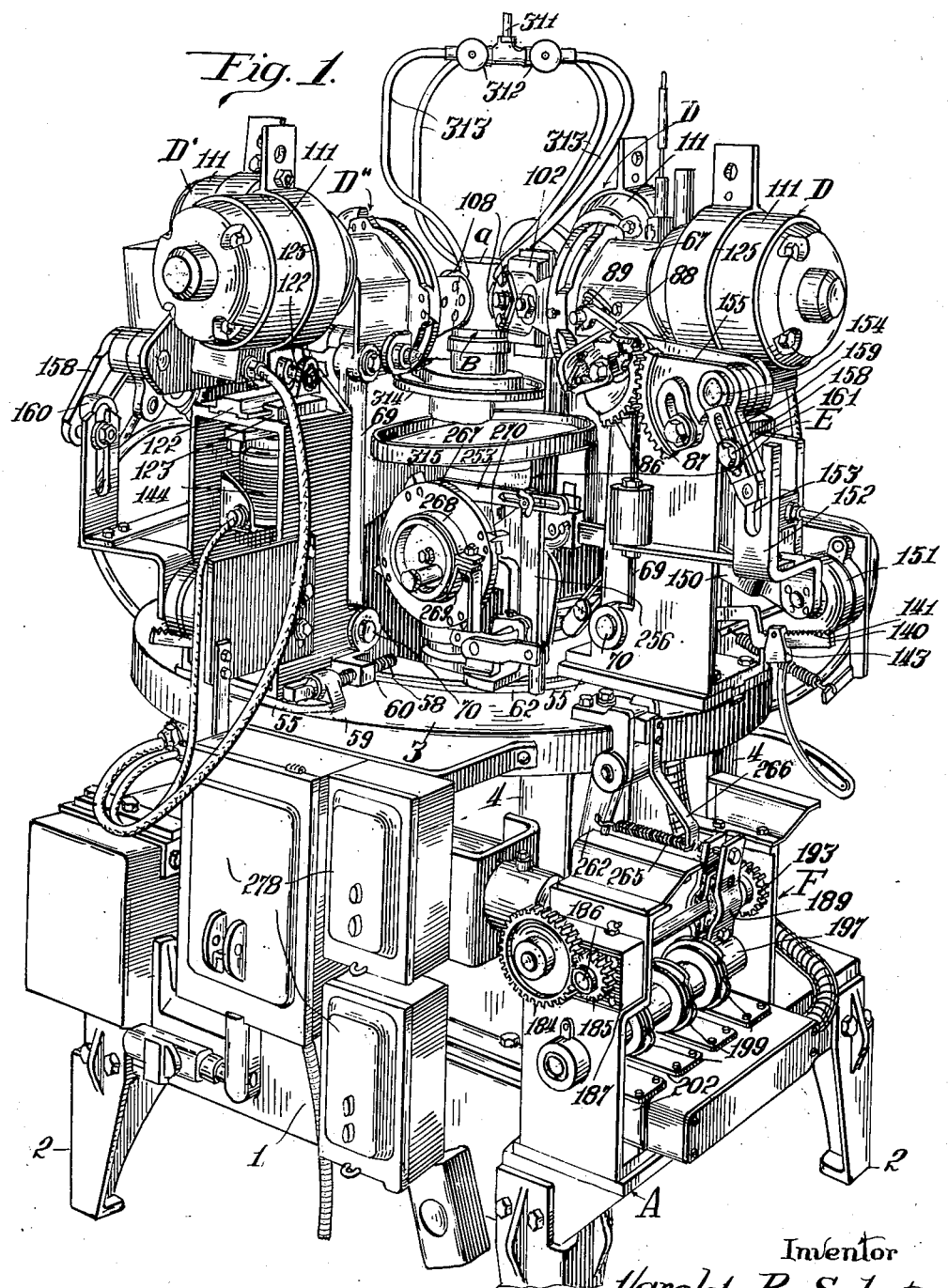
Fig. 1 is a perspective view of the entire machine.

The reason for making these different adjustments of the position of grinding wheel 108 will now be pointed out. It will be noted that the central axis $x$ lies in the plane of rotation of the grinding wheel. For making cuts of the type shown, for example, in Figs. 27 to 31, inclusive, the auxiliary frame 102 will be centered so that the grinding surface of wheel 108 will be in alignment with this central axis $x$. For making designs of the types shown in Figs. 27, 28, 29, 33 and 36, the indexing mechanism will be disconnected and the frame 72 will not be rotated or indexed between successive grinding operations. (It might here be noted that the grinding wheel will normally be positioned to rotate in a vertical plane, as indicated in Figs. 1 and 2, instead of in a horizontal plane, as shown in Fig. 6. It was shown in the horizontal position in Fig. 6 to facilitate the disclosure.) When cutting designs of the type shown in Fig. 31 the frame 72 is indexed through 90° between each successive pair of grinding operations, so that the grinding wheel will be alternately positioned vertically and horizontally. The design shown in Fig. 30 can be made by indexing the wheel each time through a shorter arc. The design shown in Fig. 31 can also be cut, without indexing the grinding wheels between cuts, by setting one pair of opposed wheels horizontal and the other pair vertical, and then adjusting one pair of the heads D laterally or arcuately (by means of adjusting bolt 63) so that the horizontal cuts will be offset a suitable distance circumferentially of the tumbler with respect to the vertical cuts. With this adjustment the tumbler must be indexed through 180° (instead of the usual 90°) before the series of cutting operations will be completed.

In making designs of the type shown in Figs. 27 to 33, inclusive, and 36, the tumbler is indexed forward, or rotated through a short arc, after each grinding operation so as to position a new surface on the tumbler in front of the grinding wheel. The mechanism for doing this will be described later. On the other hand, when cutting designs of the type shown in Figs. 34 and 35, the tumbler is left stationary while a series of successive cuts are made so as to complete a single design. The auxiliary frame 102 is now adjusted to one side so as to bring the cutting face of the grinding wheel out of alignment with the central axis $x$. A cut, such as 120, (Fig. 34) will now be made, and after the cut has been completed the frame 72 will be indexed through a short arc and the next cut 121 will be made, and so on, throughout the circular series. To make the design shown in Fig. 34, six successive cuts are made without indexing the tumbler. The tumbler will then be indexed through a certain arc and the operation repeated. The design shown in Fig. 35 is made in a similar manner, except for the fact that the grinding wheel is adjusted further to one side of the central axis $x$, and the indexing movements are shorter so as to make more cuts.

Figure 34:
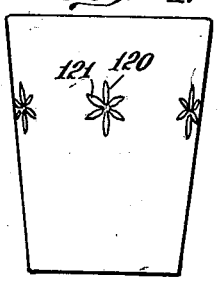
Figure 35:
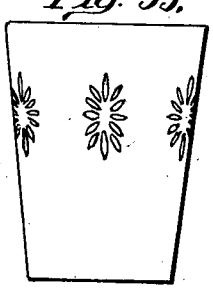

A design of the type shown in Fig. 32 may be made by indexing both the grinding wheel and the tumbler after each cut, the grinding wheel being first offset from the axis $x$ as was done in Figs. 34 and 35. This Fig. 32 design can also be cut by maintaining the grinding wheel in axis $x$ and not indexing the wheel, but raising or lowering the tumbler as it is indexed between cuts by mechanism hereinafter described.

It will be apparent that the grinding wheel must be withdrawn from engagement with the glass article after each cut is completed, and also in order to permit the tumbler to be rotated or indexed to a new grinding position. This is accomplished by moving each entire grinding head assembly radially as a unit from or toward the central axis of shaft C. (See Figs. 1, 2, 6, 7 and 8.) As already described the inner portion of the head-assembly is pivotally mounted at the upper end of the pair of levers 69 swinging about shaft 70. A slide 122 (Fig. 8) is movable radially of the machine in a slideway 123 carried by the top 124 of housing 51. The motor strap 125, encircling motor 111, is buckled at 126 and secured about a bushing 127 pivoted on bolt 128 adjustably clamped in the slots 129 in the yoke arms 130 extending upwardly from slide 122. As the head assembly is moved in or out (by the mechanism hereinafter described) there will be a slight pivotal action on the bolt 128 and shaft 68, but the assembly will have substantially a rectilinear or translatory movement toward or from the tumbler. By adjusting the bolt 128 up or down in slots 129 the assembly can be tilted about shaft 68 so as to properly position the grinding wheel 108 lengthwise of the tumbler.

A lever 131 fulcrumed at 132 on the lug 133 projecting inwardly from frame 51 has its short forked upper arms 134 engaged about the flattened intermediate portion 135 of the shaft 68. The longer lower arm of lever 131 carries a pin 136 which is engaged by the forked upper end 137 of the arm 138 of a bell crank lever, the hub 139 of which is pivoted on the central portion of shaft 70. The other arm 140 of this bell crank projects outwardly in a substantially horizontal direction, and the upper outer end portion of this lever is notched at 141 to receive the pin 142 by which the counter-weight 143 is suspended. The parts of this swinging assembly are so balanced about the pivotal center 70 that a portion of the weight of the assembly, adjusted by selectively suspending the weight 143 from one of the notches 141, serves to hold the grinding wheel 108 against the glass article with the desired pressure.

An electrically actuated solenoid 144 is supported in a vertical position within casing 51 and is adapted, when energized, to draw up a core 145 having in its lower end a pin 146 from which is suspended a link 147 slotted at 148 to receive a pin 149 mounted in the lever arm 140. The forked end of a crank arm 150 is engaged with the pin 146 of core 145, this crank arm being attached to the rotary element of a shock-absorbing device 151 of any suitable type, the example here shown being of the well known type currently used on Ford automobiles. A second crank arm 152, connected to swing in unison with crank arm 150 is formed with a long slot 153. The gear sector 87 (Fig. 2), previously referred to, which serves to actuate the indexing mechanism previously described, is pivoted on a pin 154 carried by the swinging grinding head assembly and is secured to one arm 155 of an operating bell crank also pivoted on pin 154, by means of the locking screw 156 mounted in the gear sector and extending through a slot 157 in the outer portion of lever arm 155. The other arm 158 of this operating bell crank is formed with a slot 159 and a slideway in which is mounted the slide block 160 secured adjustably in place by means of bolt 161. A pin 162 in the outer end of block 160 engages within the slot 153 in crank arm 152.

When the solenoid 144 is energized, it will draw up the core 145 (Fig. 6) and through link 147 lift the lever 140 and cause the grinding head to be moved outwardly so as to withdraw the grinding wheel 108 from engagement with the tumbler. At the same time the bell crank consisting of crank arms 150 and 152 will be swung upwardly and outwardly, and through the adjustable connections just described will swing the intermeshing gear sectors 87 and 86 and operate the indexing mechanisms. The first part of this swinging movement is utilized in unlocking the ratchet wheel 81 and housing 72 by withdrawing the locking pins 75 and 98, so that the indexing movement will not begin until the grinding wheel 108 is entirely clear of the tumbler. Also the indexing movement will have been completed and the ratchet wheel and housing relocked by the time this outward swinging movement of the head has been completed. When solenoid 144 is de-energized the core 145 will be permitted to drop and the weight 143 will return the grinding head in the opposite direction so as to bring grinding wheel 108 again into engagement with the glass tumbler. In order to successfully grind a glass article, as in hand grinding operations, it is desirable to ease the tools gently into engagement with the glass article, and this is the function of the shock absorber 151. The downward movement of core 145 will be resisted by this shock absorber, through crank arm 150, and through link 147 the downward swinging movement of weighted lever 140 will be snubbed so as to ease the grinding tool into position. As soon as the work has been encountered, the core 145 will continue to fall, the pin 149 moving upwardly through the slotted link 147. Therefore the resistance of the shock absorber 151 will only be exerted on the swinging head assembly until the grinding wheel has been eased into engagement with the work, after which the shock absorber will have no influence on the pressure exerted by adjustable weight 143 on the grinding wheel.

Figure 37:
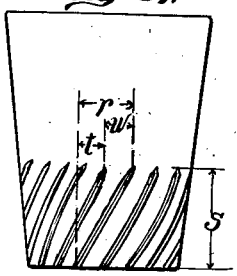
Figure 38:
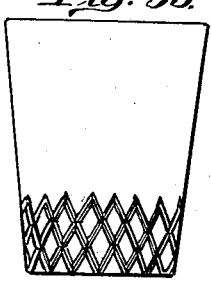
Figure 22:
Figure 23:
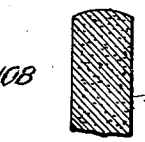
Figure 24:
Figure 25:
Figure 26:

It will be apparent by this time that in order to make successive cuts of a circular series of designs extending around the tumbler, it is necessary to index the tumbler about its longitudinal axis, that is rotate it through a short arc, after each cut has been completed. When making certain types of designs, for example those shown in Figs. 33 and 36, it is also necessary to move the tumbler longitudinally while a cut is being made. Also in making certain designs, such as indicated in Figs. 37 and 38, it is necessary to both rotate the tumbler and move it longitudinally while a cut is being made. These tumbler-movements are accomplished by the mechanism indicated generally at E in the center of the machine. This mechanism is actuated from a driving assembly, indicated generally at F, and located in the lower portion of the machine, this driving mechanism also controlling the operation of the solenoids 144 so as to properly time the sequence of operations throughout the machine.

This driving mechanism F (see Figs. 1 to 5 inclusive) is actuated by a continuously running motor 163, which through reduction gearing 164, drives a shaft 165 carrying a pinion 166. This pinion 166 meshes with a gear 167 mounted on a short shaft 168 journaled at one end in roller bearing 169 and slidable at the other end in a sleeve 170 slidably and rotatably mounted in a bearing 171 formed in the supporting frame 172. On the outer end of sleeve 170 is a bevel gear 173 adapted to mesh with a driven bevel gear 174. Interlocking tongue and slot connections 175 between gear 167 and sleeve 170 cause these parts to rotate as a unit but permit the sleeve 170 to be shifted longitudinally. The clutch-operating solenoid 176 is adapted to draw up the core 177 and through links 178 swing the bellcrank 179 pivoted at 180, the shorter forked arm of this bellcrank engaging within the collar 181 formed on sleeve 170. It will now be seen that the beveled driving gear 173 rotates continuously, but when solenoid 176 is energized the sleeve 170 will be pulled inwardly so as to withdraw gear 173 from engagement with the bevel gear 174. The solenoid 176 may be energized both manually and automatically, as will be hereinafter pointed out, and it will be noted that whenever the solenoid 176 is energized the clutch will be opened and the machine operations will be stopped.

Figure 3:
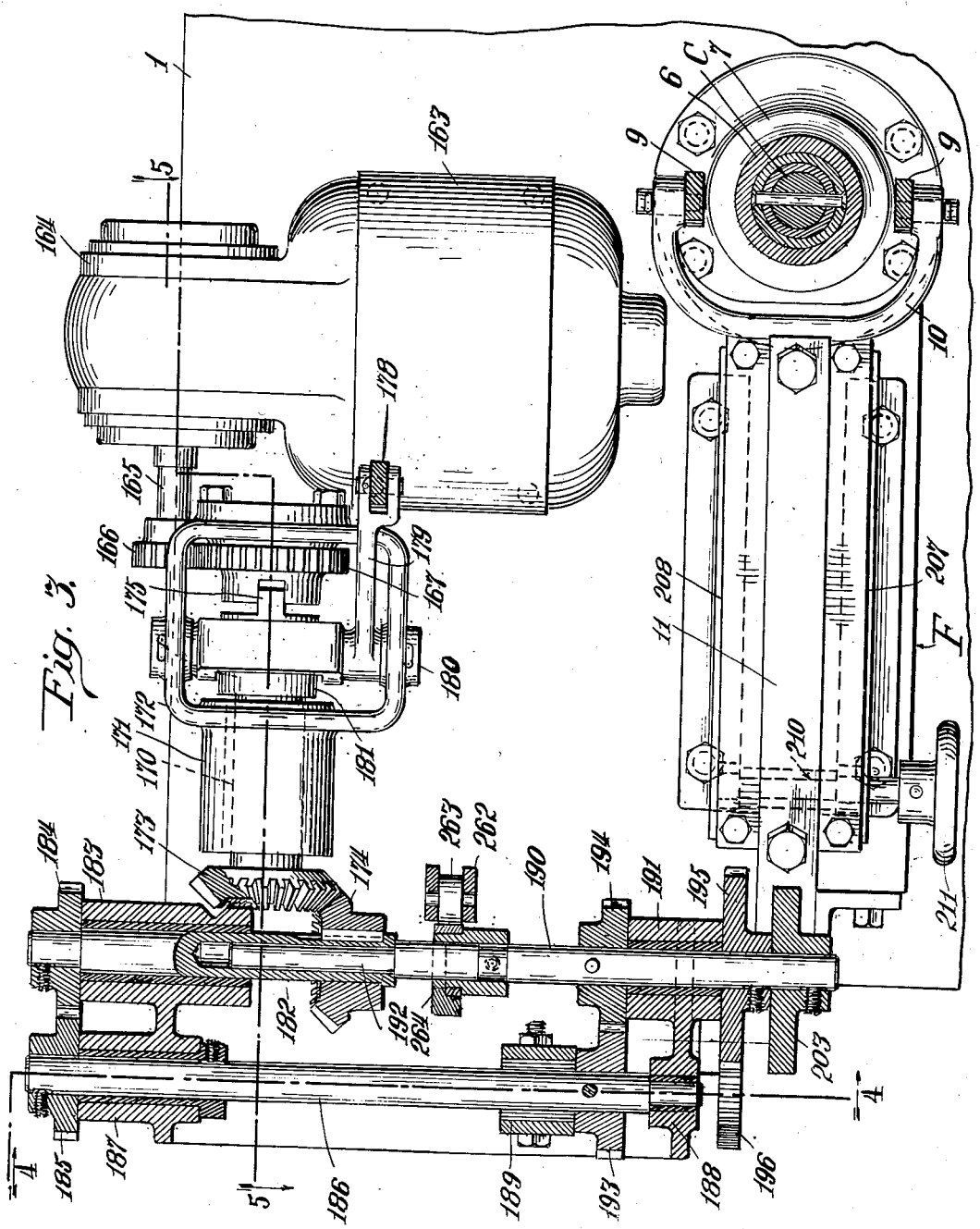
Fig. 3 is an enlarged horizontal section taken substantially on the line 3—3 of Fig. 2.
Figure 4:
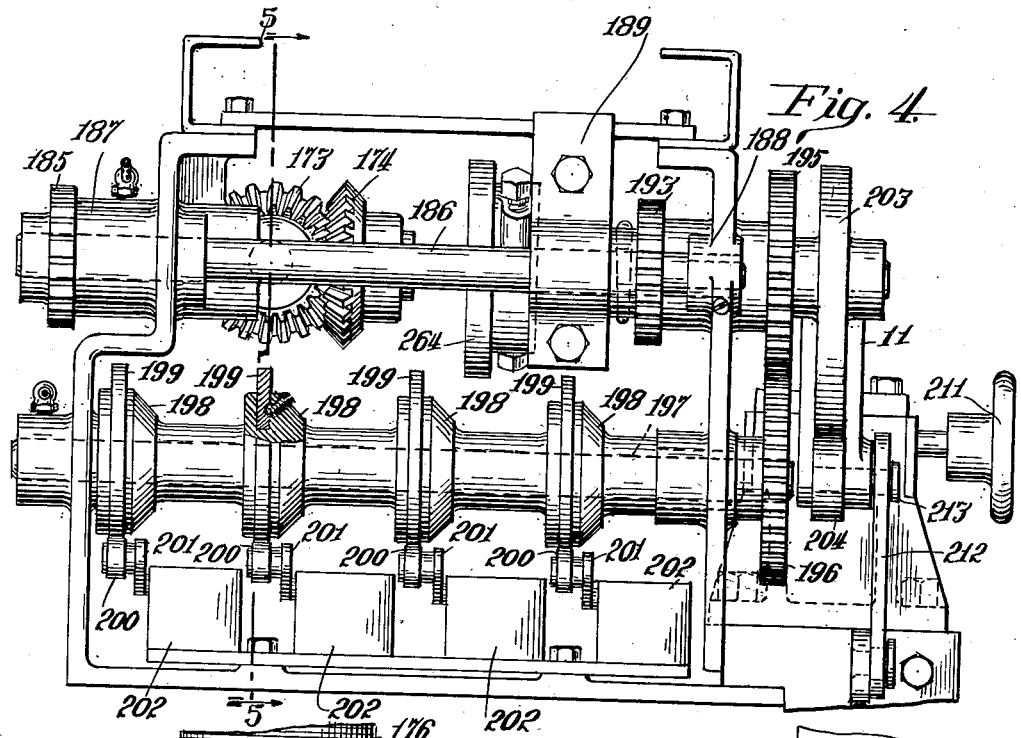
Fig. 4 is a vertical section taken substantially on the line 4—4 of Fig. 3.
Figure 5:
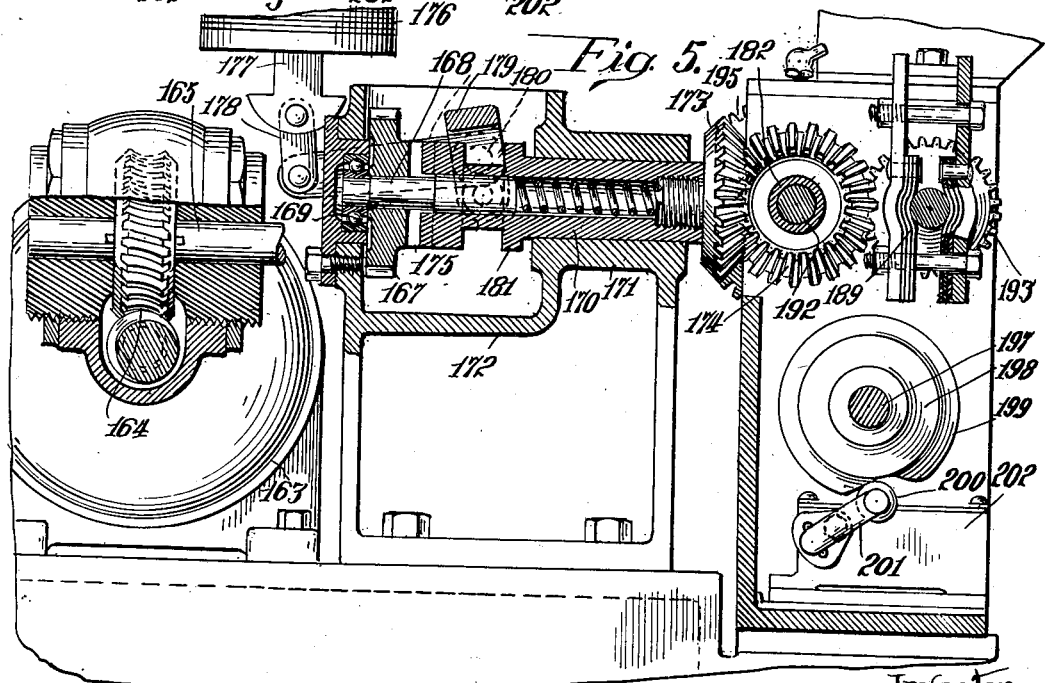
Fig. 5 is a vertical section taken substantially on the line 5—5 of Figs. 3 and 4.
Figure 19:
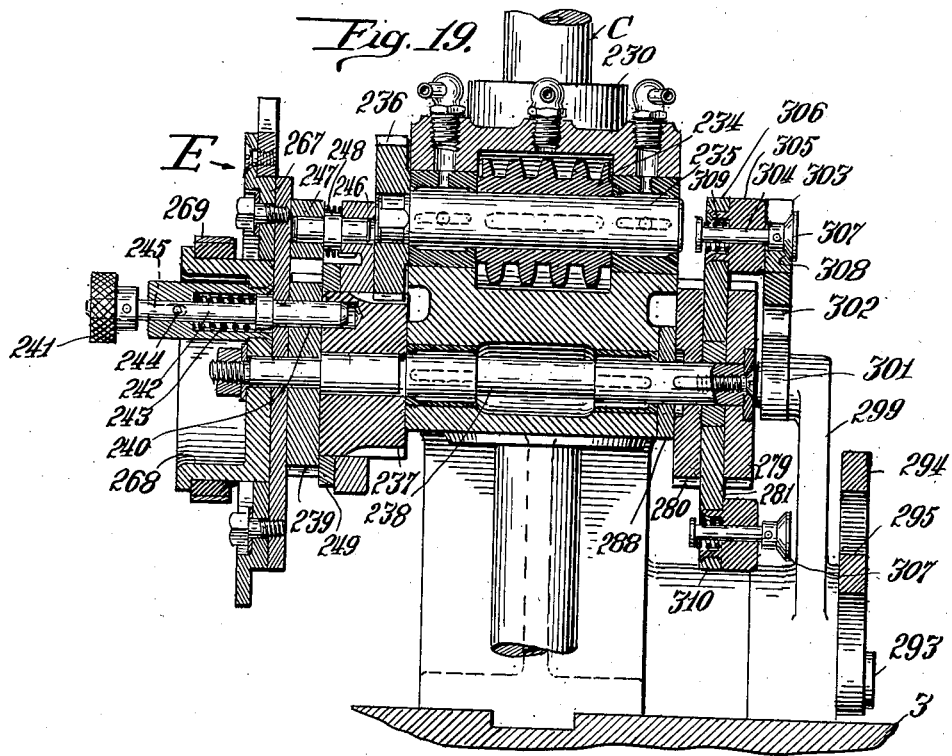
Fig. 19 is a vertical section through the tumbler-indexing mechanism, taken substantially on the line 19—19 of Fig. 2.

The driven bevel gear 174 is mounted on a shaft 182 journaled in bearing 183, and rotatably connected through gears 184 and 185 with a second shaft 186 journaled in bearings 187 and 188. The braking device 189 on shaft 186 exerts a constant drag and serves to prevent over-running of the parts when the clutch is released. A counter-shaft 190 is journaled in a bearing 191, and also its reduced inner end portion 192 is journaled within the end of shaft 182. Shaft 190 is driven from shaft 186 through gears 193 and 194. With the gear train as indicated in Fig. 3, the shafts 190 and 182 will rotate substantially in unison, but the gears 184 and 185 can be removed and gears having a different ratio substituted, (see Fig. 1), so that at times the counter-shaft 190 will rotate at a different speed from shaft 182.

The gear 195 on the outer projecting end portion of counter-shaft 190 drives gear 196 on the cam-shaft 197. On cam-shaft 197 are mounted a plurality of cam blocks 198, one for each of the grinding heads. In each cam block is removably mounted a cam plate 199 on which travels a roller 200 carried by the operating lever 201 of a switch 202 which controls the energizing circuit for one of the head-operating solenoids 144. By properly designing and selecting the cam plate 199, the periods of time during which the grinding wheel is in engagement and out of engagement with the glass article can be varied as desired. It may be noted that ordinarily all of the grinding heads will be timed in unison and under such circumstances one operating switch would suffice for all of the solenoids. However, since it may be desirable at times to operate the heads independently, a separate switch mechanism is provided for each solenoid.

The mechanism for shifting the tumbler longitudinally of its axis while a cut is being made will now be described. A cam 203 (Figs. 2, 3 and 4) fixed on the outer end portion of shaft 190 engages a roller 204 mounted in the end of lever 11, previously described. The central portion of lever 11 is slotted, as indicated at 205, and provided with a rack 206 along one side of the slot. The supports 207 and 208 on either side of the lever are also slotted and provided with racks, as indicated at 209. The fulcrum assembly indicated at 210 is provided with slide blocks and gears movable along trackways in the slots and engaging with the racks. By means of the adjusting hand wheel 211 on one end of this fulcrum member its position can be adjusted longitudinally of the slideways thus changing the effective lengths of the two lever arms of the operating lever 11. The cam 203 is continuously rotated (in counter-clockwise direction as seen in Fig. 2) and will permit the lever 11 to slowly tilt and through link 9 lower the central shaft assembly C and the chuck B and tumbler, this operation taking place while the cut is being made. The rotation of the cam is so timed that after a cut has been completed, the roller 204 will be quickly run up onto the high portion of the cam, thus raising the tumbler to a new position while the grinding tool is out of engagement therewith. This mechanism is used while making cuts of the types shown for example in Figs. 33, 36, 37 and 38. When this lifting mechanism is not being used, for example, when making cuts such as illustrated in Figs. 27 to 32, inclusive, the lifting mechanism is locked out of operation by swinging the link 212 (see Fig. 2) up into engagement with the pin 213 on lever 11 (see Fig. 4). This will hold the parts in elevated position and the cam 203 will rotate idly without affecting the lifting mechanism.

Figure 36:
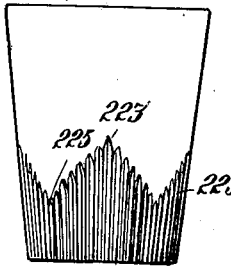

When cutting a design of the type shown for example in Fig. 36, the tumbler must be moved longitudinally between cutting operations so that the next cut will start at a different location lengthwise of the tumbler. At such times a cam track is substituted for the circular track 12 shown in Figs. 2 and 14. A cam track of this type is shown, for example, at 214 in Figs. 17 and 18. The rollers 215 which are carried by the shaft assembly C, and which are substituted for the rollers 13 shown in Figs. 2 and 11, are provided with a plurality of rounded projections or teeth 216 adapted to engage in the spaced grooves 217 in the upper edge of cam track 214. The purpose of the teeth 216 and sockets 217 is simply to prevent slippage between the cam track and rollers. It will be understood that the cam 214 does not rotate, whereas the tumbler and shaft C may be rotated or indexed about the central vertical axis of the machine (by the indexing mechanism hereinafter described) so that the rollers 215 will travel along the curved or sloping cam path and thus alternately raise and lower the shaft and tumbler. The arm 218 of the carriage supported by roller 215 has a lower block extension 219 in which is slidable a locking bolt 220 urged outwardly by spring 221 so that the rounded end of the bolt will snap into a selected one of a series of openings 222 in the cam ring 214. This serves to yieldably lock the shaft assembly in each of its angularly adjusted positions.

Remembering that the tumbler is reversed, that is bottom side up, during the grinding operation, the roller 215 will be positioned on one of the high points of the cam path (as in Fig. 17) when one of the longer cuts 223 (Fig. 36) is being made, and will be positioned over a low point 224 of the cam when one of the short cuts 225 is being made. Intermediate cuts are made at intermediate positions on the cam. While the grinding tool is in engagement with the tumbler, the cam 214, roller 215, shaft C and the tumbler will be moved vertically by the cam 203, lever 11, etc. as described hereinabove.

A design of the type shown in Fig. 32 can also be made by using a cam and roller of the type shown in Figs. 17 and 18. The mechanism for moving the shaft and tumbler while the cut is being made is put out of service by engaging the hooked link 212 with pin 213 on lever 11. A cut such as 226 (Fig. 32) will be made while roller 215 is on a low point 224 of the cam path, and cut 227 will be made while the roller is on a high point as shown in Fig. 17. Intermediate cut 228 will be made while the roller is on an intermediate point 229 of the cam. Obviously the cam can be curved or sloped as desired and provided with any number of high and low points in accordance with the type of design that is to be cut.

The central tumbler moving assembly E will now be described, attention being directed first to the mechanism for indexing the tumbler between cutting operations (see particularly Figs. 1, 2, 14, 19 and 20). The shaft C is rotatable in and vertically slidable through a pair of spaced apart bearings 230 and 231 in a fixed frame 232, and a worm wheel 233 mounted between said bearings is slidably keyed to the shaft C. A worm 234 (Fig. 19) is secured on a shaft 235 having on one outer end a gear 236 meshing with a gear 237 secured on one outer end portion of a second shaft 238 also mounted in frame 232. A ratchet wheel 239 rotatable on shaft 238 is normally clutched to gear 237 by means of the clutch pin 240. The pin 240 may be withdrawn so as to permit the ratchet 239 to turn idly, by pulling out on knob 241 at the outer end of stem 242 against the resistance of spring 243. The pin 244 in stem 242 is withdrawn from slot 245 and the stem rotated so as to hold the clutch in withdrawn position. A pawl-holder 246, rotatably mounted on the hub of gear 237, carries a pawl 247 normally urged into engagement with the teeth of ratchet 239 by a spring 248. The pawl-lifting plate 249, also pivoted on the hub of gear 237, has a high portion 250 adapted to hold pawl 247 out of engagement with the ratchet teeth during a portion of its arc of travel. This pawl lifter is adjustable by means of the bolt 251 projecting through a slot 252 in the plate. It will be seen that by properly adjusting the plate 249, the operating (counterclockwise) arc of travel of the pawl 247 can be divided as desired between an ineffective portion while the pawl is riding on plate 249, and the effective portion after the pawl engages the ratchet teeth. An operating link 253 connected at one end with pawl holder 246 has its other end slotted at 254 (Figs. 2 and 6) to adjustably receive a pin 255 in one arm 256 of a bellcrank pivoted at 257. The other arm 258 of this bellcrank is connected by link 259 with one arm 260 of a second bellcrank lever pivoted at 261. The other arm 262 of this bellcrank carries a roller 263 engaging a cam 264 (Fig. 3) mounted on counter-shaft 190. The roller is held against the cam by means of a spring 265 connected between lever arm 262 and a fixed bracket 266 (see Figs. 1 and 2).

Figure 20:
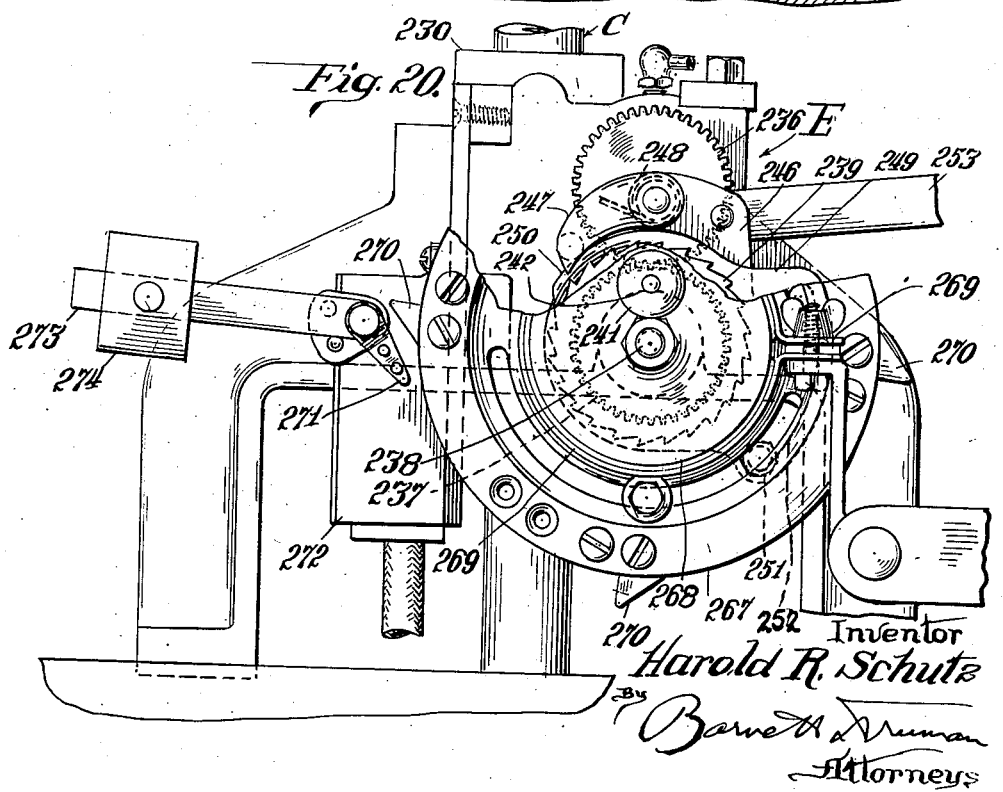
Fig. 20 is an elevation, partially broken away, looking from the left at Fig. 19.

It will be noted that cam 264 is preferably provided with two separate rises spaced 180° apart (Fig. 2) so that each half rotation of cam 264 will, through the chain of lever mechanisms just described, cause an oscillation of the pawl holder 246 and thereby turn the ratchet 239 through a predetermined arc in a counter-clockwise direction (as seen in Fig. 20) the length of this arc being determined by the adjustment of pawl-lifter 249. This movement of the ratchet, through the train of gears 237, 236, 234 and 233 will rotate shaft C through a predetermined arc, thus indexing the tumbler to a new grinding position.

A cam disc 267 and a brake drum 268 are secured to ratchet wheel 239 and mounted to rotate on the projecting end of shaft 238. A brake band 269 (Figs. 1, 19 and 20) anchored to a fixed portion of the frame, constantly engages the drum 268 to hold the parts in adjusted position during the return movement of the pawl, and while a cutting operation is taking place.

A plurality of cams 270 are spaced equi-distance around the periphery of cam disc 267, there being as many cams 270 as there are grinding heads. In the present example there are four of these cams spaced 90° apart. As the disc 267 is rotated in a counter-clockwise direction (Fig.

20) each cam 270 will engage the short arm 271 of an operating lever to close the switch 272, the lever having a longer arm 273 weighted at 274 to open the switch as soon as the cam passes out of engagement with the lever 271. Switch 272 controls the circuit for energizing the clutch-operating solenoid 176. It will be apparent that since there are four grinding heads operating simultaneously upon the tumbler, after the tumbler has been indexed step by step through an arc of 90°, a complete circumferential design will have been completed. At the end of this movement one of the cams 270 will close switch 272 so as to withdraw the clutch and stop the machine. The parts are so timed that this will take place when the grinding heads are withdrawn or out of grinding position. After the finished tumbler has been withdrawn and a new tumbler positioned in the chuck, the machine can be re-started by pushing the "start" button 275 in a manually operable switch assembly 276 positioned at any convenient position on the machine, (see Fig. 2). This will break the energizing circuit for solenoid 176 and permit the driving gearing to be re-clutched to the constantly rotating motor 163. This same operation of the "start" button 275 serves to energize the solenoid 49 which establishes the vacuum connection to the tumbler holding chuck. The machine can also be stopped at any time by pushing the "stop" button 277 which energizes clutch solenoid 176. When the machine is stopped, the solenoid 49 will also be deenergized so as to break the vacuum connection to the tumbler holding chuck and permit the finished tumbler to be removed. It may be stated at this point that while the several motors previously described normally rotate continuously, these motors can be stopped and started whenever desired by the control devices indicated generally at 278 (Fig. 1).

The mechanism E also includes devices for simultaneously rotating the shaft C and moving it longitudinally of its axis so as to make spiral or inclined cuts, such as illustrated for example in Figs. 37 and 38. This mechanism is shown best in Figs. 2, 14, 19 and 21. When this "spiraling" mechanism is in operation, the clutch pin 240 will be withdrawn so that the indexing mechanism last described will operate idly and will not rotate the gear 237. Keyed on the opposite end portion of shaft 238 are two ratchet wheels 279 and 280 having their teeth facing in opposite directions so that ratchet 279 will cause counter-clockwise rotation of shaft 238 and ratchet 280 will cause clockwise rotation, as seen in Fig. 21. A pawl holder 281 is mounted for oscillation about shaft 238 between the two ratchet wheels and carries a pair of pawls 282 and 283 both pivoted on pin 284 and adapted to engage the ratchets 279 and 280, respectively. The spring 285 interposed between ears 286 projecting from the respective pawls tends to urge both pawls into engagement with the respective ratchet wheels at all times. It will now be seen that when the pawl holder 281 is rotated in a counter-clockwise direction (Fig. 21) the pawl 282 will engage ratchet 279 and cause counter-clockwise rotation of shaft 238, and when the pawl holder is swung back in the opposite or clockwise direction, the pawl 283 will engage ratchet 280 and cause clockwise rotation of shaft 238. The pawl-lifting pin 287 carried by a normally fixed but adjustable plate 288 projects through a slot 289 in the oscillating pawl holder so as to be within the path of travel of the pawls 282 and 283. By adjusting the locking bolt 290 mounted in plate 288 along a slot 291 in a fixed member 292 the pin 287 can be positioned so that one or the other of the pawls will ride up on this pin during a portion of its arc of travel, thereby decreasing the length of the arc in which one of the pawls is effectively engaged with its ratchet. As a consequence, the clockwise rotation of the operating shaft 238 will be somewhat longer or of greater amplitude than the counterclockwise rotation, or vice versa, according to the positioning of pin 287.

A bellcrank lever pivoted at 293 (Fig. 2) comprises a long arm 294 having a slot 295 in which is adjustably positioned a pivot device 296 also engaging in the slotted end of a link 297 connected at its other end 298 with the mechanism for lifting the shaft C. It will be apparent that as the shaft is reciprocated by the operation of cam 203, lever 11 and link 9, the bellcrank will be shifted about its pivot 293, the amplitude of this movement depending upon the adjustment of the pivotal connection 296 between levers 294 and 297. The other arm 299 of this bellcrank is pivoted at 300 to one end of a link 301. In the opposite end portion of this link are formed a downwardly opening slot 302 and a similar upwardly opening slot 303. (See Figs. 19 and 21). A locking pin 304 extends through a block 305 mounted on an ear 306 extending upwardly from pawl holder 237. The outer conical end portion 307 of locking pin 304 is adapted to be drawn into the dished opening 308 formed at the base of slot 303 by the spring 309 confined about the opposite end portion of the locking pin. An exactly similar locking device is positioned in the ear 310 projecting downwardly from the pawl holder 237, and is adapted to be engaged in the lower slot 302 of link 301. By merely changing the connection of link 301 from the upper ear of the pawl holder to the lower ear, the order of oscillations of the pawl holder and pawls can be reversed, thereby changing the direction or inclination of the spirals cut on the glass article. For example, with the parts connected as shown in the drawings (Figs. 2 and 21) as the shaft C is moved upwardly the pawls will be rotated in a clockwise direction and will be returned in a counter-clockwise direction when the shaft is lowered. If the link 301 is connected with the lower ear 310 of the pawl holder, the pawls will be rotated in a counter-clockwise direction as the shaft is elevated and in a clockwise direction as the shaft is lowered.

Referring now to Fig. 37, it will be noted that the tumbler must be rotated through an arcuate distance $r$ while the tumbler is being moved longitudinally through the distance $s$ to make one of the cuts, but the reverse rotation of the tumbler when returning it through the vertical distance $s$ to position the tumbler for the next succeeding cut should only be through the arc $t$, since the tumbler should be indexed forwardly through the arc $w$ between each cutting operation. In order to accomplish this the pawl-lifting pin 287 is set so that the reverse arc of travel caused by one of the pawls, such as 282, will be less than the arc of travel caused by the other pawl 283.

In cutting a design such as indicated for example in Fig. 38, one complete circumferential series of cuts are made as explained in connection with Fig. 37, and then the direction of the cuts is reversed by shifting the connection of link 301 with the pawl holder, as already described. The operations are then repeated so as to cut the second series of designs in the opposite direction.

Referring now to Figs. 1 and 2, it will be noted that a water supply pipe 311 extending to a central location above the machine is connected through valves 312 with flexible branch pipes 313 leading to suitable discharge positions above each grinding wheel. The water and ground glass is caught by a pan 314 positioned about the central shaft and in turn draining into a second larger pan 315 having a drain pipe 316 leading therefrom to any convenient place of disposal.

Fig. 39 shows a simplified diagram of the electrical connections, solely for the purpose of clarifying the operation of the parts. It will be understood that the actual electrical wiring may be more complicated and include relays and starter switches not here shown. At 317, 318 and 319 are shown the power lines of a 3-wire alternating current supply system. One of the switches 278 (see Fig. 1) connects the main motor 163 with this source of supply, and a second switch 278 serves to connect or disconnect the several head motors 111 with this same source of electrical energy. The several head tilting solenoids 144 are connected in parallel in a circuit extending from line wire 318 through wire 320, wire 321, switch 202 closed by cam 199, wire 322, solenoid 144 and wire 323 to power line 319. As already noted, all of the cams 199 are similarly set so that the solenoids 144 will be energized or de-energized simultaneously, and a single cam-operated switch could be used to close the circuits through all of the solenoids. However, the construction shown permits the heads to be swung back separately, if so desired, by properly setting the individual cams 199.

At 324 is shown the operating magnet of a relay adapted when energized to move contact arm 325 into engagement with a fixed contact 326. When magnet 324 is de-energized, spring 327 moves contact arm 325 into engagement with the fixed contact 328. As hereinabove described, when one of the cam arms 270 engages lever arm 271, the normally open switch 272 will be closed. The starting switch 275 is normally closed. The stop switch 277 is normally opened. When a grinding operation is completed and cam 270 engages arm 271, switch 272 will be closed thus completing the following circuit: From wire 317 through wire 329, magnet 324, wire 330, switch 272, wire 331, switch 275 and wire 332 to the power line 318. The relay will now be energized to draw arm 325 into engagement with contact 326 thus completing the following circuit for energizing the solenoid 176: From power line 317 through wire 329, wire 333, solenoid 176, wire 334, contact 326, arm 325 and wire 335 to power line 318. This will disconnect the main clutch and stop the machine. The stop switch 277 is connected in shunt with the automatic stop switch 272 through wire 336 so that the clutch may be thrown out at any time by merely pushing stop switch 277. In order to start the machine again, switch 275 is operated to break the circuit at this switch thereby de-energizing magnet 324 and thus breaking the energizing circuit for solenoid 176 which will again clutch in the main operating motor 163.

Solenoid 49 which controls the vacuum connection to chuck B is normally energized (when the machine is operating) through the following circuit: From main wire 317 through wires 329 and 337, solenoid 49, wire 338, contact 328, swinging contact arm 325 and wire 335 to main 318. When relay 324 is energized to close the circuit through clutch solenoid 176, the normally closed circuit through solenoid 49 will be broken at the relay by moving arm 325 away from contact 328. This will break the vacuum connection through chuck B and permit the tumbler a to be removed.

When switch 275 is operated to open this switch and start the machine, the clutch operating solenoid 176 will be deenergized and at the same time the solenoid 49 will be energized to again complete the vacuum connection to the chuck. The switch 275 is held closed until cam 270 has moved away from the switch arm 271 so as to permit this switch to automatically open, after which starting switch 275 can again be permitted to close and the machine will continue to operate until a cutting operation has been completed.

As will be apparent from the preceding descriptions of the various parts that may be used alternatively or with different adjustments, the sequence of operation of this mechanism will vary according to the design that is being cut. For designs of the type shown, for example, in Figs. 27 to 33, and 36 to 38, the machine when started by switch 275 will continue to operate until a complete circumferential series of cuts have been made, whereupon it will automatically be stopped (when the cutting tools are out of engagement with the tumbler) by the engagement of one of the cams 270 with the stop switch arm 271. At this time the vacuum will be released so that the tumbler can easily be lifted from the chuck and replaced by a new tumbler. By operating the starting switch 275 this series of operations is automatically repeated. When making designs of the type shown in Figs. 34 and 35, for example, the tumbler indexing mechanism is disconnected and when the machine is once started it will automatically continue to operate until four of the circular designs have been completed (one by each tool). The machine is then stopped and either a new tumbler is inserted or the tumbler then in the machine is indexed through a certain angle providing more than four designs are to be cut on the tumbler.

While this machine has been designed especially for decorating glass tumblers, it should be understood that many other forms of articles could be ground or decorated by this same type of apparatus, and the term "tumbler" in the specification and claims is to be interpreted in this general sense. Also articles made of materials other than glass might be treated by this apparatus.

I claim:—

1. In a tumbler decorating machine, means for holding a tumbler, a grinding head comprising a grinding tool and means for rotating the tool, means for supporting the head for movement toward or from the tumbler holding means, means normally tending to move the head toward the tumbler holding means so as to hold the tool in grinding engagement with a tumbler positioned on the holding means, tool-withdrawing means having a lost motion connection with the head moving means and normally moving to a position out of effective engagement therewith when the tool is in grinding engagement with the tumbler, means for automatically moving said tool-withdrawing means in one direction so as to engage the head moving means and move the tool away from the tumbler holding means, and yieldable braking means connected with and resisting the return movement of the tool-withdrawing means to its normal ineffective position whereby the tool will be eased back into engagement with a tumbler on the holding means but the braking means will subsequently be ineffective to influence further movement of the tool in this direction.

2. In a tumbler decorating machine, means for holding a tumbler, a grinding head comprising a grinding tool and means for rotating the tool, means for supporting the head for movement toward or from the tumbler holding means, means normally tending to move the head toward the tumbler holding means so as to hold the tool in grinding engagement with a tumbler positioned on the holding means, tool-withdrawing means which normally moves to a position out of effective engagement with the head supporting means, electrically actuated means for automatically moving said tool-withdrawing means in one direction so as to engage the head supporting means and move the tool away from the tumbler holding means, and yieldable braking means connected with and resisting the return movement of the tool-withdrawing means to its normal ineffective position whereby the tool will be eased back into engagement with a tumbler on the holding means but the braking means will subsequently be ineffective to influence further movement of the tool in this direction.

3. In a tumbler decorating machine, means for holding a tumbler, a grinding head comprising a grinding tool and means for rotating the tool, means for supporting the head for movement toward or from the tumbler holding means, a lever connected with the head-supporting means, head-moving means normally acting on the lever to swing the head toward the tumbler holding means and press the tool against a tumbler positioned in the holding means, electrically actuated means for lifting the lever in opposition to the head-moving means to release the tool from grinding engagement with the tumbler, and braking means effective in opposition to the head-moving means only until the tool has engaged with the tumbler.

4. In a tumbler decorating machine, means for holding a tumbler, a grinding head comprising a grinding tool and means for rotating the tool, means for supporting the head for movement toward or from the tumbler holding means, a lever connected with the head-supporting means, head-moving means normally acting on the lever to swing the head toward the tumbler holding means and press the tool against a tumbler positioned on the holding means, automatic means for lifting the lever in opposition to the head-moving means to release the tool from grinding engagement with the tumbler, said means including a solenoid having a core which is lifted when the solenoid is energized, means for energizing the solenoid, a link suspended at one end from the core and having a pin-and-slot connection at its lower end with the lever, and a braking means connected with the core to cushion its downward movement and thus ease the tool into engagement with the tumbler.

5. In a tumbler decorating machine, means for holding a tumbler, a grinding head comprising a grinding tool and means for rotating the tool, means for supporting the head for movement toward or from the tumbler holding means, a lever connected with the head supporting means, head-moving means acting on the lever to swing the head toward the tumbler holding means and press the tool against a tumbler positioned on the tumbler holding means, automatic means for lifting the lever in opposition to the head-moving means to release the tool from grinding engagement with the tumbler, said means including a solenoid having a core which is lifted when the solenoid is energized, means for energizing the solenoid, and connections between the core and lever.

6. In a tumbler decorating machine, means for holding a tumbler, a grinding head comprising a grinding tool and means for rotating the tool, means for supporting the head for movement toward or from the tumbler holding means comprising a substantially vertical lever mechanism supported at its lower end on a fixed pivot, the head being pivotally supported at the upper end of the lever mechanism, a slide member pivotally connected with one end portion of the head and movable in a fixed slideway whereby the head is given a substantially rectilinear reciprocating movement toward or from the tumbler-holding means as the lever mechanism is swung toward or from the tumbler-holding means from one side to the other of its vertical position, and means comprising an auxiliary lever mechanism engaging the vertical supporting lever mechanism at a point above its lower fixed pivot for automatically swinging the vertical lever mechanism and the head carried thereby toward or from the tumbler holding means.

7. In a tumbler decorating machine, means for holding a tumbler, a grinding head comprising a grinding tool and means for rotating the tool, means for supporting the head for movement toward or from the tumbler holding means comprising a substantially vertical lever mechanism supported at its lower end on a fixed pivot, the head being pivotally supported at the upper end of the lever mechanism, a slide member pivotally connected with one end portion of the head and movable in a fixed slideway whereby the head is given a substantially rectilinear reciprocating movement as the lever mechanism is swung from one side to the other of its vertical position, and means for automatically moving the head toward or from the tumbler holding means comprising weighted means for urging the head toward the tumbler holding means, a solenoid for moving the head in the opposite direction, and means for energizing the solenoid.

8. In a tumbler decorating machine, means for holding a tumbler, a grinding head, a grinding tool, means for supporting the head for movement toward or from the tumbler holding means, a tool-supporting frame journaled for angular adjustment about an axis substantially normal to the tumbler surface to be ground, this axis being positioned in the plane of rotation of the grinding tool, means for moving the head in one direction to bring the tool into grinding engagement with a tumbler positioned on the tumbler holding means, automatically operated means for moving the head in the other direction to withdraw the tool from the tumbler, and means for indexing the frame and tool about the above mentioned axis while the tool is out of engagement with the tumbler comprising a ratchet-wheel, a pawl, a pawl-holder oscillatable about the axis of rotation of the ratchet, and mechanism actuated by the last mentioned head moving means for oscillating the pawl-holder.

9. In a tumbler decorating machine, means for holding a tumbler, a grinding head, a grinding tool, means for supporting the head for movement toward or from the tumbler holding means, a tool-supporting frame journaled for angular adjustment about an axis substantially normal to the tumbler surface to be ground, this axis being positioned in the plane of rotation of the grinding tool, means for moving the head in one direction to bring the tool into grinding engagement with a tumbler positioned on the tumbler holding means, a solenoid operable when energized to move the head in the other direction to withdraw the tool from the tumbler, means to energize the solenoid, and means for indexing the frame and tool about the above mentioned axis while the tool is out of engagement with the tumbler comprising a ratchet-wheel, a pawl, a pawl-holder oscillatable about the axis of rotation of the ratchet, and mechanism actuated by the solenoid for oscillating the pawl-holder.

10. In a tumbler decorating machine, means for holding a tumbler, a grinding head, means for supporting and moving the head toward or from the tumbler holding means, the head comprising a grinding wheel, means for rotating the wheel, a wheel-supporting frame journaled for angular adjustment about an axis substantially normal to the tumbler surface to be ground, this axis being positioned in the plane of rotation of the grinding wheel, and means for indexing the frame and wheel about this axis comprising a ratchet wheel, a pawl-holder oscillatable about the axis of rotation of the ratchet, a pawl carried by the holder, there being a plurality of locking openings in the ratchet wheel, locking means comprising a pin selectably movable into said openings, a spring for urging the pin into locking position, a cam movably mounted on the pawl-holder, a spring normally urging the cam into position to engage a portion of the locking means to lift the pin out of an opening during the ratchet-operating movement of the pawl, and a second cam carried by the locking means and engaging the first mentioned cam to swing the latter to ineffective position during the return movement of the holder and pawl.

11. In a tumbler decorating machine, means for holding a tumbler, a grinding head, means for supporting and moving the head toward or from the tumbler holding means, the head comprising a grinding wheel, means for rotating the wheel, a wheel-supporting frame journaled for angular adjustment about an axis substantially normal to the tumbler surface to be ground, this axis being positioned in the plane of rotation of the grinding wheel, and means for indexing the frame and wheel about this axis comprising a ratchet wheel, a pawl-holder oscillatable about the axis of rotation of the ratchet, a pawl carried by the holder, there being a plurality of locking openings in the ratchet wheel, locking means comprising a pin selectably movable into said openings, a spring for urging the pin into locking position and cooperating cam members on the holder and locking means functioning to withdraw the locking pin only during the ratchet-operating movement of the pawl.

12. In a tumbler decorating machine, means for holding a tumbler, a grinding head, means for supporting and moving the head toward or from the tumbler holding means, the head comprising a grinding wheel, a main wheel-supporting frame journaled for angular adjustment about an axis substantially normal to the tumbler surface to be ground, this axis being positioned in the plane of rotation of the wheel, means for indexing the frame about this axis, an auxiliary frame in which the wheel is journaled, said auxiliary frame being pivotally supported in the main supporting frame about an axis perpendicular to the first mentioned axis, and means for rotating the wheel comprising a motor and a train of gearing connecting the motor and wheel, certain gears of said train being centered about said axes so as to permit angular adjustment of either or both frames without interfering with the functioning of the gear train.

13. In a tumbler decorating machine, means for holding a tumbler, a grinding head comprising a main supporting frame, means for supporting and moving the head toward or from the tumbler holding means, the head comprising a grinding wheel, means for rotating the wheel, a wheel-supporting frame journaled for angular adjustment about an axis substantially normal to the tumbler surface to be ground, this axis being positioned in the plane of rotation of the grinding wheel, means for indexing the frame and wheel about this axis, means for locking the wheel-supporting frame to the head-frame in indexed position, and means operated by the indexing mechanism for releasing the locking means during an indexing operation.

14. In a tumbler decorating machine, means for holding a tumbler, a grinding head comprising a main supporting frame, means for supporting and moving the head toward or from the tumbler holding means, the head comprising a grinding wheel, means for rotating the wheel, a wheel-supporting frame journaled for angular adjustment about an axis substantially normal to the tumbler surface to be ground, this axis being positioned in the plane of rotation of the grinding wheel, means for indexing the frame and wheel about this axis comprising a ratchet-wheel, a pawl-holder, a pawl carried by the holder, a locking bolt slidable in the main frame into and out of locking engagement with the wheel-supporting frame, lever mechanism for moving the bolt, and cooperating cam-members on the pawl-holder and lever mechanism, respectively, for unlocking the bolt when the pawl-holder is moved to index the ratchet.

15. In a tumbler decorating machine, means for holding a tumbler, a grinding head comprising a main supporting frame, means for supporting and moving the head toward or from the tumbler holding means, the head comprising a grinding wheel, means for rotating the wheel, a wheel-supporting frame journaled for angular adjustment about an axis substantially normal to the tumbler surface to be ground, this axis being positioned in the plane of rotation of the grinding wheel, means for indexing the frame and wheel about this axis comprising a ratchet-wheel, a pawl-holder, a pawl carried by the holder, there being a plurality of locking openings in the ratchet wheel, a locking lever comprising a pin selectably movable into said openings, a spring for urging the pin into locking position, a locking bolt supported in the main frame and movable into locking engagement with the wheel-supporting frame, means actuated by the locking lever for moving the bolt, and cooperating cam-members on the locking lever and pawl-holder respectively for unlocking the pin and bolt when the pawl-holder is moved to index the ratchet.

16. In a tumbler-decorating machine, means for holding a tumbler comprising a chuck rotatable about a central axis, a plurality of grinding heads, each head comprising a grinding tool, means for rotating the tool, and means for adjustably supporting the heads at spaced intervals about the chuck, said latter means comprising a fixed platform positioned substantially perpendicular to the central axis of the chuck, a plurality of supporting plates, one for each head, mounted on the platform, means for separately guiding each plate along an arc centered at the central axis, means for locking each plate to the platform in angularly adjusted position, a head-supported base mounted on each plate for slidable adjustment radially of the platform, and means for adjusting the base along the plate toward or from the central axis.

17. In a tumbler decorating machine, a tumbler supporting mechanism comprising a shaft, means for supporting the shaft for rotary and longitudinal movement, a rest carried by the shaft for receiving the open end of a tumbler, a centering chuck yieldably carried by the shaft for engaging the inner surface of the tumbler, a conduit comprising a passage leading through the shaft to the interior of the tumbler, a three-way valve having one outlet communicating with this conduit, a connection from another outlet to an exhausting device, a connection from the third valve-outlet to air at atmospheric pressure, and means for moving the valve to alternately exhaust air from the tumbler or break this vacuum comprising a valve operating crank, a solenoid, means actuated by the solenoid for operating the crank, and means for energizing the solenoid.

18. In a tumbler decorating machine, a tumbler supporting mechanism comprising a shaft, means for supporting the shaft for rotary and longitudinal movement, a rest carried by the shaft for receiving the open end of a tumbler, a centering chuck yieldably carried by the shaft for engaging the inner surface of the tumbler, a conduit comprising a passage leading through the shaft to the interior of the tumbler, a three-way valve having one outlet communicating with this conduit, a connection from another outlet to an exhausting device, a connection from the third valve-outlet to air at atmospheric pressure, means for moving the valve to alternately exhaust air from the tumbler or break this vacuum comprising a valve operating crank, a solenoid comprising a core, connections between the solenoid-core and crank for moving the valve to one position when the solenoid is energized, and a spring for moving the valve to its other position when the solenoid is de-energized.

19. In a tumbler decorating machine, a chuck for holding a tumbler, a grinding tool, means for moving the tool into and out of grinding engagement with a tumbler positioned on the chuck, a shaft supporting the chuck, said shaft being mounted for rotation or movement longitudinally of its axis, means for intermittently rotating the shaft through a predetermined arc between successive grinding operations to index the tumbler to new grinding positions, and means for moving the non-rotating chuck longitudinally of its central axis during each grinding operation comprising a collar in which the shaft is rotatably supported, means comprising a rotary cam for shifting the collar, and means synchronized with the tool-moving means and the indexing means for rotating the cam so that the shaft and chuck will be shifted longitudinally while the tool is in grinding position and the shaft is not rotating and the shaft and chuck will be quickly returned to the initial longitudinal position between grinding operations and while the shaft is being indexed.

20. In a tumbler decorating machine, a chuck for holding a tumbler, a grinding tool, means for moving the tool into and out of grinding engagement with a tumbler positioned on the chuck, a shaft supporting the chuck, said shaft being mounted for rotation or movement longitudinally of its axis, means for intermittently rotating the shaft through a predetermined arc between successive grinding operations to index the tumbler to new grinding positions, and means for moving the non-rotating chuck longitudinally of its central axis during each grinding operation comprising a collar in which the shaft is rotatably supported, an adjustable lever mechanism for shifting the collar, a rotary cam for actuating the lever-mechanism, and means synchronized with the tool-moving means and the indexing means for rotating the cam so that the shaft and chuck will be shifted longitudinally while the tool is in grinding position and the shaft is not rotating and the shaft and chuck will be quickly returned to the initial longitudinal position between grinding operations and while the shaft is being indexed.

21. In a tumbler decorating machine, a chuck for holding a tumbler, a grinding tool, means for moving the tool into and out of grinding engagement with a tumbler positioned on the chuck, a shaft supporting the chuck, said shaft being mounted for rotation or movement longitudinally of its axis, means for intermittently rotating the shaft through a predetermined arc between successive grinding operations to index the tumbler to new grinding positions, and means for moving the non-rotating chuck longitudinally of its central axis during each grinding operation comprising a collar in which the shaft is rotatably supported, a lever, means at one end of the lever engaging the cam, means connecting the other end of the lever with the collar, a fulcrum member adjustable longitudinally of the lever, and means synchronized with the tool-moving means and the indexing means for rotating the cam so that the shaft and chuck will be shifted longitudinally while the tool is in grinding position and the shaft is not rotating and the shaft and chuck will be quickly returned to the initial longitudinal position between grinding operations and while the shaft is being indexed.

22. In a tumbler decorating machine, a chuck for holding a tumbler, a grinding tool, means for moving the tool into and out of engagement with a tumbler positioned on the chuck, means for indexing the tumbler about its longitudinal axis to a new grinding position while the tool is out of grinding position, comprising a rotary shaft supporting the chuck, gearing for rotating the shaft including a ratchet wheel, a pawl, a pawl-holder, means for urging the pawl into engagement with the ratchet, an adjustable cam-plate for determining the arc of engagement of the pawl with the ratchet-wheel, and means automatically actuated in timed relation to the tool moving means for swinging the pawl-holder.

23. In a tumbler decorating machine, a chuck for holding a tumbler, a grinding tool, means for moving the tool into engagement with a tumbler positioned on the chuck, electrically actuated means for withdrawing the tool from engagement with the tumbler, and means for indexing the tumbler to a new grinding position while the tool is out of grinding position, comprising a rotary shaft supporting the chuck, gearing for rotating the shaft including a ratchet wheel, a pawl, a pawl-holder, means for swinging the pawl-holder including a rotary cam, a switch for controlling the electrically actuated means, a cam for operating the switch, and rotary means for actuating the cams in timed relation.

24. In a tumbler decorating machine, a chuck for holding a tumbler, a grinding tool, means for moving the tool into and out of grinding engagement with a tumbler positioned on the chuck, a shaft supporting the chuck, said shaft being stationary during grinding operations but being mounted for rotation or movement longitudinally of its axis, means synchronized with the tool-moving means for intermittently rotating the shaft through a predetermined arc between successive grinding operations to index the tumbler to new grinding positions, and means cooperating with the last-mentioned means for shifting the shaft and chuck longitudinally as it is indexed between grinding operations comprising a stationary annular cam surrounding the shaft, and a roller mounted on the shaft and engaging the cam.

25. In a tumbler decorating machine, a chuck for holding a tumbler, a grinding tool, means for moving the tool into and out of grinding engagement with a tumbler positioned on the chuck, a shaft supporting the chuck, said shaft being stationary during grinding operations but being mounted for rotation or movement longitudinally of its axis, means synchronized with the tool-moving means for intermittently rotating the shaft through a predetermined arc between successive grinding operations to index the tumbler to new grinding positions, and means cooperating with the last-mentioned means for shifting the shaft and chuck longitudinally as it is indexed between grinding operations comprising a stationary annular cam surrounding the shaft, and a roller mounted on the shaft and engaging the cam, the roller and cam having interengaging tooth portions.

26. In a tumbler decorating machine, a chuck for holding a tumbler, a grinding tool, means for moving the tool into and out of grinding engagement with a tumbler positioned on the chuck, a shaft supporting the chuck, said shaft being stationary during grinding operations but being mounted for rotation or movement longitudinally of its axis, means synchronized with the tool-moving means for intermittently rotating the shaft through a predetermined arc between successive grinding operations to index the tumbler to new grinding positions, and means cooperating with the last-mentioned means for shifting the shaft and chuck longitudinally as it is indexed between grinding operations comprising a stationary annular cam surrounding the shaft, a roller mounted on the shaft and engaging the cam, and means for yieldingly locking the roller in selected positions along the cam.

27. In a tumbler decorating machine, a chuck for holding a tumbler, a grinding tool, means for moving the tool into and out of engagement with a tumbler positioned on the chuck and means for moving the tumbler during the grinding operations to make spiral cuts on the tumbler comprising means for simultaneously reciprocating and oscillating the chuck, and means for reversing the directions of the oscillations with respect to the reciprocations.

28. In a tumbler decorating machine, a chuck for holding a tumbler, a grinding tool, means for moving the tool into and out of engagement with a tumbler positioned on the chuck and means for moving the tumbler during the grinding operations to make spiral cuts on the tumbler and for indexing the tumbler between grinding operations, comprising means for simultaneously reciprocating and oscillating the chuck, and means for decreasing the amplitude of the oscillations in one direction with respect to the amplitude of the oscillations in the other direction.

29. In a tumbler decorating machine, a chuck for holding a tumbler, a grinding tool, means for moving the tool into and out of engagement with a tumbler positioned on the chuck and means for moving the tumbler during the grinding operations to make spiral cuts on the tumbler and for indexing the tumbler between grinding operations, comprising means for simultaneously reciprocating and oscillating the chuck, and means for decreasing the amplitude of the oscillations in one direction with respect to the amplitude of the oscillations in the other direction, and means for reversing the direction of the oscillations with respect to the direction of the reciprocations.

30. In a tumbler decorating machine, a chuck for holding a tumbler, a grinding tool, means for moving the tool into and out of grinding engagement with a tumbler positioned on the chuck, a rotary shaft for supporting the chuck, and means synchronized with the tool moving means for moving the tumbler during a grinding operation to make a spiral cut on the tumbler and returning the tumbler for a succeeding grinding operation comprising means for reciprocating the shaft, means for oscillating the shaft comprising a pair of ratchet-wheels, a pawl-holder, a pair of pawls carried by the holder and positioned to engage the respective ratchet wheels, and means actuated by the shaft reciprocating means for oscillating the pawl-holder.

31. In a tumbler decorating machine, a chuck for holding a tumbler, a grinding tool, means for moving the tool into and out of grinding engagement with a tumbler positioned on the chuck, a rotary shaft for supporting the chuck and means synchronized with the tool moving means for moving the tumbler during a grinding operation to make a spiral cut on the tumbler and returning the tumbler for a succeeding grinding operation comprising means for reciprocating the shaft, means for oscillating the shaft comprising a pair of ratchet-wheels, a pawl-holder, a pair of pawls carried by the holder and positioned to engage the respective ratchet wheels, and means actuated by the shaft reciprocating means for oscillating the pawl-holder, said last-mentioned means comprising means for reversing the order of the oscillating movements to determine the direction of the spiral cut.

32. In a tumbler decorating machine, a chuck for holding a tumbler, a grinding tool, means for moving the tool into and out of grinding engagement with a tumbler positioned on the chuck, a rotary shaft for supporting the chuck, and means synchronized with the tool moving means for moving the tumbler during a grinding operation to make a spiral cut on the tumbler and for indexing the tumbler between grinding operations, comprising means for moving the shaft longitudinally and partially rotating the shaft in one direction while the grinding operation is in progress, and for moving the shaft back in the other longitudinal direction and partially rotating the shaft in the reverse direction between grinding operations, one of the partial rotations being of greater arcuate length than the other.

33. In a tumbler decorating machine, a chuck for holding a tumbler, a grinding tool, means for moving the tool into and out of grinding engagement with a tumbler positioned on the chuck, a rotary shaft for supporting the chuck, and means synchronized with the tool moving means for moving the tumbler during a grinding operation to make a spiral cut on the tumbler and for indexing the tumbler between grinding operations, comprising means for moving the shaft longitudinally and partially rotating the shaft in one direction while the grinding operation is in progress, and for moving the shaft back in the other longitudinal direction and partially rotating the shaft in the reverse direction between grinding operations, one of the partial rotations being of greater arcuate length than the other, and means for reversing the directions of the two rotative movements to change the direction of the spiral cuts.

34. In a tumbler decorating machine, a chuck for holding a tumbler, a grinding tool, means for moving the tool into and out of grinding engagement with a tumbler positioned on the chuck, a rotary shaft for supporting the chuck, and means synchronized with the tool moving means for moving the tumbler during a grinding operation to make a spiral cut on the tumbler and for indexing the tumbler between grinding operations, comprising means for reciprocating the shaft, means for oscillating the shaft comprising a pair of ratchet wheels, a pawl-holder, a pair of pawls carried by the holder and engaging the respective ratchet-wheels, means actuated by the shaft-reciprocating means for oscillating the pawl-holder and a pawl-lifter acting selectively on the pawls to determine the relative lengths of effective arcuate movement of the pawls.

35. In a tumbler decorating machine, a chuck for holding a tumbler, a grinding tool, means for moving the tool into and out of grinding engagement with a tumbler positioned on the chuck, a rotary shaft for supporting the chuck, and means synchronized with the tool moving means for moving the tumbler during a grinding operation to make a spiral cut on the tumbler and for indexing the tumbler between grinding operations, comprising means for reciprocating the shaft, means for oscillating the shaft comprising a pair of ratchet wheels, a pawl-holder, a pair of pawls carried by the holder and engaging the respective ratchet wheels, means actuated by the shaft-reciprocating means for oscillating the pawl-holder, a pawl-lifter acting selectively on the pawls to determine the relative lengths of effective arcuate movement of the pawls, and means for reversing the order of the opposite oscillations of the pawl-holder to determine the direction of the spiral cuts.

36. In a tumbler decorating machine, a chuck for holding a tumbler, a grinding tool, means for moving the tool into and out of engagement with a tumbler positioned on the chuck, a rotary shaft for supporting the chuck, and means synchronized with the tool moving means for moving the tumbler during a grinding operation to make a spiral cut on the tumbler and for indexing the tumbler between grinding operations, comprising means for reciprocating the shaft, means for oscillating the shaft comprising a pair of ratchet wheels, a pawl-holder, a pair of pawls carried by the holder and engaging the respective ratchets, a pawl-lifter acting selectively upon the ratchets to determine the relative lengths of effective arcuate movement of the pawls, and means for oscillating the pawl-holder and for reversing the order of the oscillations to determine the direction of the spiral cuts comprising a link, means connected with one end of the link and actuated by the shaft reciprocating means for reciprocating the link, and means for alternatively engaging the other end portion of the link with the pawl-holder at opposite sides of its center of oscillation.

37. In a tumbler decorating machine, a chuck for holding a tumbler, a grinding tool, means for moving the tool into and out of engagement with a tumbler positioned on the chuck, a rotary shaft for supporting the chuck, and means synchronized with the tool moving means for moving the tumbler during the grinding operation to make a spiral cut on the tumbler comprising means for reciprocating the shaft, means for oscillating the shaft comprising a pair of ratchet wheels, a pawl-holder, a pair of pawls carried by the holder and engaging the respective ratchets, and means for oscillating the pawl-holder and for reversing the order of the oscillations to determine the direction of the spiral cuts comprising a link, means connected with one end of the link and actuated by the shaft-reciprocating means for reciprocating the link, and means for alternatively engaging the other end portion of the link with the pawl-holder at opposite sides of its center of oscillation.

HAROLD R. SCHUTZ.